United States Patent
Wodin et al.

(10) Patent No.: US 10,754,059 B2
(45) Date of Patent: Aug. 25, 2020

(54) COMPACT AND HIGHLY SENSITIVE GRAVITY GRADIOMETER

(71) Applicant: SRI International, Menlo Park, CA (US)

(72) Inventors: Jesse Wodin, Denver, CO (US); Sunil Goda, Menlo Park, CA (US); Eric Lavelle, San Jose, CA (US); Jan van der Laan, Palo Alto, CA (US); Ronald Pelrine, Longmont, CO (US); David Watt, Superior, CO (US)

(73) Assignee: SRI International, Menlo Park, CA (US)

( * ) Notice: Subject to any disclaimer, the term of this patent is extended or adjusted under 35 U.S.C. 154(b) by 246 days.

(21) Appl. No.: 15/917,256

(22) Filed: Mar. 9, 2018

(65) Prior Publication Data

US 2019/0277998 A1    Sep. 12, 2019

(51) Int. Cl.
| | | |
|---|---|---|
| *G01V 7/00* | (2006.01) | |
| *G01V 7/06* | (2006.01) | |
| *G01V 7/04* | (2006.01) | |
| *G01V 7/12* | (2006.01) | |
| *G01P 15/093* | (2006.01) | |

(52) U.S. Cl.
CPC ............ *G01V 7/005* (2013.01); *G01P 15/093* (2013.01); *G01V 7/04* (2013.01); *G01V 7/06* (2013.01); *G01V 7/12* (2013.01)

(58) Field of Classification Search
CPC ...................................................... G01V 7/005
USPC ......................................................... 73/382 G
See application file for complete search history.

(56) References Cited

U.S. PATENT DOCUMENTS

| | | | |
|---|---|---|---|
| 4,550,601 A * | 11/1985 | Evans | G01V 7/16 73/382 R |
| 5,396,136 A | 3/1995 | Pelrine | |
| 6,265,945 B1 | 7/2001 | Delaney et al. | |
| 6,320,472 B1 | 11/2001 | Vanier | |
| 6,361,268 B1 | 3/2002 | Pelrine et al. | |
| 2008/0271533 A1 | 11/2008 | Csutak | |
| 2017/0371065 A1* | 12/2017 | Guzman | G01P 21/00 |

FOREIGN PATENT DOCUMENTS

| | | | | |
|---|---|---|---|---|
| WO | WO-8303010 A1 * | 9/1983 | | G01P 15/093 |
| WO | 2015199684 A1 | 12/2015 | | |

OTHER PUBLICATIONS

International Search Report and Written Opinion of International Application No. PCT/US2019/020392, dated May 21, 2019, 14 pp.
(Continued)

*Primary Examiner* — Walter L Lindsay, Jr.
*Assistant Examiner* — Philipmarcus T Fadul
(74) *Attorney, Agent, or Firm* — Shumaker & Sieffert P.A.

(57) ABSTRACT

Example gravity gradiometers are described that utilize high precision resonant optical cavities to measure changes in gravitational forces at high sensitivities. In one example, a sensing system includes a gravity gradiometer and a controller. The gravity gradiometer includes a first mirror and a second mirror arranged to form an optical cavity having an optical axis. The controller is configured to detect, responsive to displacement of at least one of the first mirror and the second mirror along the optical axis, a change in gravity gradient.

20 Claims, 10 Drawing Sheets

(56) References Cited

OTHER PUBLICATIONS

Dransfield, "Airborne Gravity Gradiometry in the Search for Mineral Deposits," Advances in Airborne Geophysics, Proceedings of Exploration 07: Fifth Decennial International Conference on Mineral Exploration Paper 20, 2007 (Applicant points out, in accordance with MPEP 609.04(a), that the year of publication, 2007, is sufficiently earlier than the effective U.S. filing date, 2018, so that the particular month of publication is not in issue.), pp. 342-354.

Kirkendall et al., "Imaging Cargo Containers Using Gravity Gradiometry," IEEE Transactions on Geoscience and Remote Sensing, vol. 45, No. 6, Jun. 2007, pp. 1786-1797.

Al-Hunaidi et al., "Remedial Measures for Traffic-Induced Vibrations at a Residential Site. Part 1:Field Tests," Canadian Acoustics, vol. 19, No. 1, 1991, pp. 3-13.

Degregoria, "Gravity Gradiometry and Map Matching: An Aid to Aircraft Inertial Navigation Systems," Airforce Institute of Technology, Mar. 2010, 130 pp.

Maier, "Underground Structures and Gravity Gradiometry," The Aerospace Corporation, Aerospace Report No. TR-2002(3000)-1, Jan. 15, 2002, 67 pp.

Black, "An Introduction to Pound-Drever-Hall Laser Frequency Stabilization," American Journal of Physics, vol. 69, No. 1, Jan. 2001, pp. 79-87.

Parmentola, "The Gravity Gradiometer as a Verification Tool," Science and Global Security, vol. 2, 1990 (Applicant points out, in accordance with MPEP 609.04(a), that the year of publication, 1990, is sufficiently earlier than the effective U.S. filing date, 2018, so that the particular month of publication is not in issue.), pp. 43-57.

Black, "Notes on the Pound-Drever-Hall technique," Technical Note, LIGO-T980045-00-D, Apr. 16, 1998, 15 pp.

Richeson, "Gravity Gradiometer Aided Inertial Navigation Within Non-GNSS Environments," University of Maryland, 2008 (Applicant points out, in accordance with MPEP 609.04(a), that the year of publication, 2008, is sufficiently earlier than the effective U.S. filing date, 2018, so that the particular month of publication is not in issue.) 438 pp.

"Open Manufacturing Program: Magnetically Actuated Micro-Robots for Advanced Manufacturing Applications," SRI International, retrieved from http://youtu.be/uL6e3co4Qqc on Aug. 9, 2018, 1 pp.

Wajima et al., "Post-Newtonian effects of gravity on quantum interferometry," Physical Review D, vol. 55, No. 4, Feb. 15, 1997, 7 pp.

* cited by examiner

COMPACT AND HIGHLY SENSITIVE GRAVITY GRADIOMETER

GOVERNMENT RIGHTS

This invention was made with Government support under contract no. HSHQDC-15-C-B0035 awarded by the Department of Homeland Security. The Government has certain rights in this invention.

TECHNICAL FIELD

The disclosure relates to sensing systems and, more particularly, gravity gradiometers for detection of gravity gradients.

BACKGROUND

Gravity gradiometers are sensing systems designed to detect the gradient, or spatial derivative, of the gravitational field of an object. As one example, an object passing near a gravity gradiometer may exert a changing gravitational force on the gradiometer due to the movement of the object near the gradiometer. The gradiometer detects the temporal evolution of the spatial derivative of the gravitational field of the object as it passes by. This temporal evolution may be used to determine the mass, density, velocity, or other related properties of the object.

Conventional gravity gradiometers typically use one or more opposing pairs of accelerometers to detect the gradient of a gravitational field along an axis. In particular, a difference in sensed acceleration between each of the pairs of accelerometers is used as an indicator of the difference in the gravitational force between two points along the axis of the gradiometer. However, these types of gravity gradiometers are often incapable of detecting small gravity gradients, and surrounding noise often diminishes the quality of the signal from the gravity gradiometer.

Due to this low sensitivity, gravity gradiometer measurements using conventional systems are often limited to the detection of signals from very large masses for applications that permit low resolution measurements. To isolate the gravity gradiometer from surrounding noise and increase sensitivity of the unit, some conventional gravity gradiometers have attempted to use complex active isolation systems to stabilize the gravity gradiometer. In other gradiometers, temperature stabilization systems are applied to the pairs of accelerometers to try and achieve more accurate scale factor matching. For example, superconducting gravity gradiometers implement large cryogenic systems to stabilize the accelerometers at low temperatures, thereby trying to improve sensitivity. In this way, various conventional gravity gradiometers often achieve very low sensitivity or, in order to increase sensitivity, often become large, unwieldy, and expensive sensing systems.

SUMMARY

In general, this disclosure describes compact and highly sensitive gravity gradiometers. Example gravity gradiometers are described that utilize high precision resonant optical cavities to measure the temporal evolution of the gradient of a gravitational field at high sensitivities. In one example, a gravity gradiometer includes a set of mirrors that form a compact optical cavity that is resonant with laser light. In response to a change in gravitational field, the set of mirrors differentially moves along the optical axis to create a change in the length of the optical cavity and reflect a portion of the resonant laser light. The set of mirrors and optical cavity are arranged such that the portion of laser light reflected by the optical cavity is highly sensitive to small changes in the optical cavity length and, correspondingly, small changes in gravitational field. As such, technical solutions for highly sensitive gravity gradiometers are described.

In some examples, to restore resonance of the optical cavity, the gravity gradiometer may use a drive and bearing system to adjust the set of mirrors to their original position. The drive and bearing system may use highly responsive and precise adjustment mechanisms, such as diamagnetic levitation and suspension, to move the set of mirrors. By using a compact, precise optical measurement system and a responsive, stable drive and bearing system, the gravity gradiometer may have a high sensitivity, low weight, low size, and low cost.

In this way, the gravity gradiometer discussed herein may provide technical advantages for detecting the temporal evolution of the gradient of a gravitational field in a variety of uses and applications. For example, due to the high sensitivity of the gravity gradiometer, the gravity gradiometer may be used to detect changes in gravitational field caused by a finite object near the gravity gradiometer. As another example, due to the compactness of the gravity gradiometer, multiple gravity gradiometers may be arranged in a small footprint array configuration and used to measure multiple components of the gravity gradient at different locations around an object. As yet another example, due to the mobility of the gravity gradiometer, the gravity gradiometer may be used in mobile applications, such as drone-based mineral searching and topology mapping.

In some examples, a gravity gradiometer includes a first mirror, a second mirror, and a drive and bearing system. The first mirror and the second mirror are arranged to form an optical cavity having an optical axis. The drive and bearing system is configured to displace at least one of the first and second mirrors along the optical axis in response to a change in gravity gradient. The optical cavity is configured to reflect an optical signal at off-resonant wavelengths in response to displacement of the at least one of the first and second mirrors along the optical axis.

In another example, a sensing system includes a gravity gradiometer and a controller. The gravity gradiometer includes a first mirror and a second mirror arranged to form an optical cavity having an optical axis. The controller is configured to detect, responsive to displacement of at least one of the first mirror and the second mirror along the optical axis, a change in gravity gradient.

In another example, a method includes detecting, responsive to displacement of a first mirror with respect to a second mirror along an optical axis, a change in a gravitational force and outputting an indication of the detected change in gravity gradient.

The details of one or more examples are set forth in the accompanying drawings and the description below. Other features, objects, and advantages of the disclosure will be apparent from the description and drawings, and from the claims.

DETAILED DESCRIPTION

Figure 1:
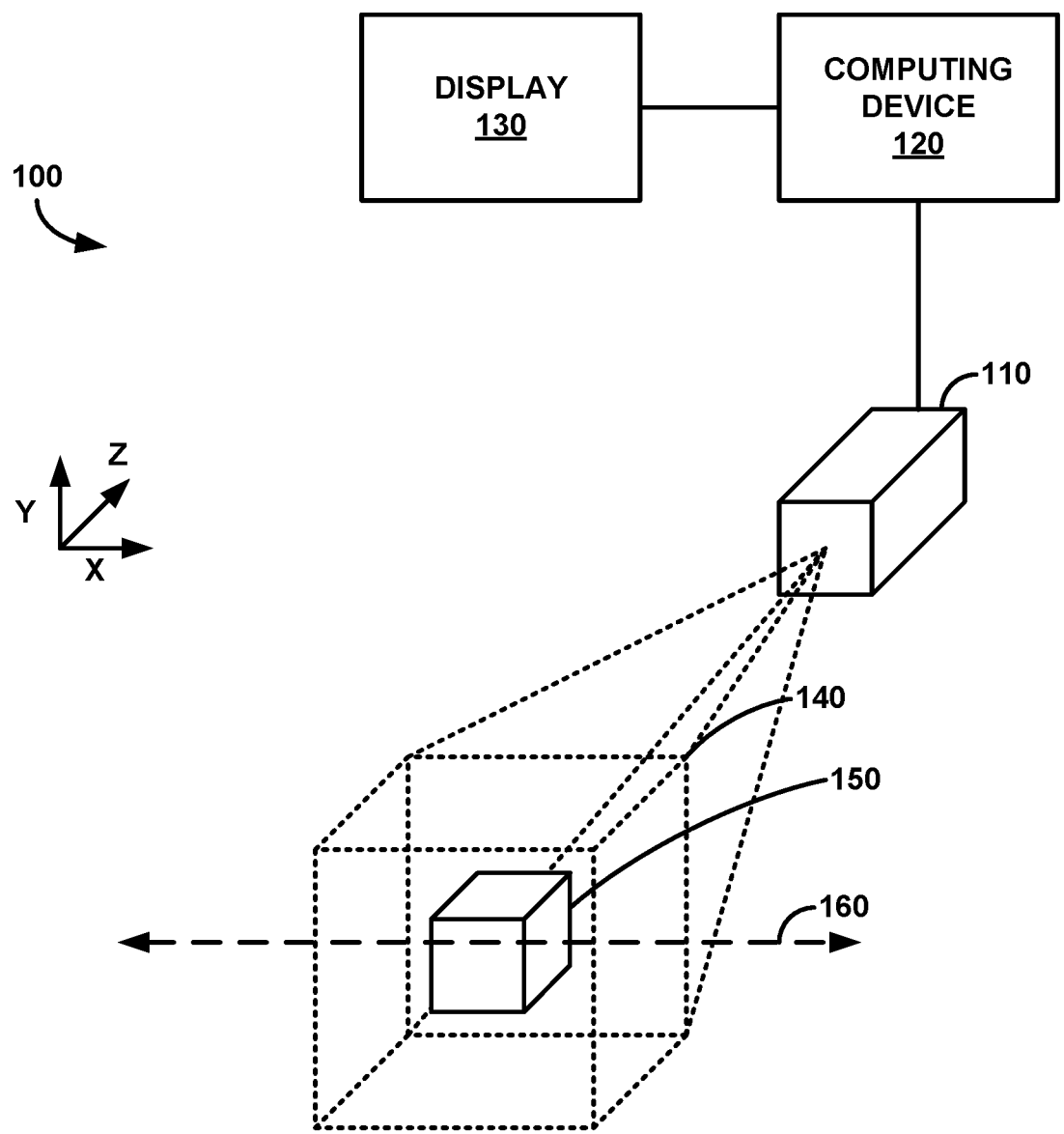
FIG. 1 is a schematic diagram of an example system for examining an object or volume based on a change in gravitational field, in accordance with embodiments discussed herein.

FIG. 1 is a schematic diagram of an example system for examining a volume based on a change in gravitational field using one or more compact, highly sensitive gravity gradiometers, in accordance with embodiments discussed herein. FIG. 1 illustrates an example sensing system 100 including a gravity gradient detection system 110, a computing device 120, and a display 130.

In the example of FIG. 1, sensing system 100 is used to detect the presence or composition of an object 150 moving through or otherwise proximate to a detection region 140 of a gravity gradient detection system 110. Detection region 140 represents a target region of gravity gradient detection system 110 that is sensitive to a relative movement path 160 of object 150 due to orientation and/or proximity of gravity gradient detection system 110. In this example, gravity gradient detection system 110 is communicatively coupled to computing device 120 and configured to send indications of the relative movement of object 150 to computing device 120. In one example, computing device 120 generates data and/or a representation of object 150 on display 130 that indicates the presence or composition of object 150.

As described in further detail below, gravity gradient detection system 110 includes one or more compact, highly sensitive gravity gradiometers. Each gravity gradiometer is configured to detect at least one component, such as an x-, y-, or z-component, of a gravity gradient due to the presence of object 150 in detection region 140 of gravity gradient detection system 110. Further, each gravity gradiometer is also configured to detect a temporal change in at least one component, such as an x-, y-, or z-component, of a gravity gradient due to relative movement between gravity gradient detection system 110 and object 150 in detection region 140. In other words, the detected gravity gradient is caused by the presence of object 150, while the detected temporal change in gravity gradient is caused by a change in a relative distance or orientation between object 150 and gravity gradient detection system 110, such as by gravity gradient detection system 110 moving detection region 140, object 150 moving through detection region 140, or a combination of gravity gradient detection system 110 and object 150 moving with respect to each other. The relative movement of object 150 through detection region 140 creates a change in mass distribution within detection region 140 by displacing significantly less dense air, which causes the change in gravitational field.

As described herein, each gravity gradiometer includes a set of mirrors that form a compact optical cavity configured to admit and retain light having a certain frequency, referred to herein as the resonant frequency of the optical cavity. The set of mirrors and optical cavity are arranged such that the resonant frequency of the optical cavity, and thus the amount of laser light reflected by the optical cavity, is highly sensitive to small changes in the optical cavity length. Moreover, the set of mirrors are movably arranged along an optical axis of the optical cavity such that the optical length, and thus the resonant frequency of the optical cavity, is highly sensitive to small changes in gravitational field caused by the relative movement of object 150 within detection region 140. For example, in response to the change in gravitational field, the set of mirrors differentially moves along the optical axis due to the differential force on the set of mirrors caused by the change in gravitational field to create a change in the length of the optical cavity. This change in the length of the optical cavity causes a slight shift in resonant frequency of the optical cavity, which in turn increases the amount of laser light that is not admitted into the cavity and instead reflected by the optical cavity. Gravity gradient detection system 110 detects the intensity of the reflected portion of the laser light and, based on the intensity, generates any necessary control signals for urging the mirrors along the optical axis to restore the initial optical length, thereby retuning the resonance frequency of the optical cavity to match the frequency of the laser light and reducing or eliminating any reflected light. As one example, to restore resonance of the optical cavity, the gravity gradiometer uses a drive and bearing system to adjust the set of mirrors to their original position. In this way, the amplitude of the control signal(s) necessary to restore the resonance frequency of the optical cavity corresponds to or is otherwise indicative of the magnitude of the change in gravity gradient, and gravitational field, caused by the relative movement of object 150. Each gravity gradiometer outputs, to computing device 120, data representative of the magnitude of the gravity gradient sensed along its optical axis, as will be described further in FIG. 2 below. In this way, multiple gravity gradiometers within sensing system 100 may be used to detect and quantify 2D or 3D gravity gradients within detection region 140. Detection region 140 may have a variety of shapes and cross-sectional shapes including, but not limited to, cones, pyramids, spheres, cubes, and the like.

In some examples, gravity gradient detection system 110 is configured to detect a single component of a gravity gradient, such as along one axis of relative movement. For example, object 150 may represent a vehicle moving along movement path 160 defined by a channel perpendicular to the optical axis of a gravity gradiometer of gravity gradient detection system 110. As the vehicle passes through detection region 140, the vehicle creates a change in gravitational field due to the mass of the truck moving into a volume previously occupied by air. The change in gravitational field creates a differential force on the two mirrors, which causes a relative displacement of the mirrors of the optical cavity along the optical axis. The control signal of the gravity gradiometer that reverses the displacement of the mirrors is proportional to the gravity gradient. Gravity gradient detection system 110 outputs the gravity gradient throughout movement path 160 as a gravity gradient waveform representing the component of the gravity gradient along the optical axis over a period of time or position of object 150.

In some examples, gravity gradient detection system 110 is configured to detect more than one component of a gravity gradient. For example, gravity gradient detection system 110 may include optical cavities arranged along two or more optical axes, such as in a single gravity gradiometer or an array of gravity gradiometers, oriented perpendicular to each other. In this example, the change in gravity gradient causes relative displacement of each optical cavity along an optical axis corresponding to a change in a component of the gravity gradient caused by relative movement of object 150 along each optical axis. Gravity gradient detection system 110 outputs data indicative of the change in gravity gradient along each component to computing device 120, which may in turn generate a three-dimensional representation of object 150 or a 3D gravity gradient rendering based on the components of the change in gravity gradient.

In general, computing device 120 uses the indication of the change in gravity gradient to generate a representation of object 150, such as a representation of the change in gravity gradient with respect to spatial orientation, time, or position. For example, computing device 120 may output a representation that includes at least one of a gravitational field representation, a gravity gradient spatial map, a gravity gradient heat map, or a gravity gradient waveform. In some examples, computing device 120 is configured to generate information related to object 150 based on the change in gravity gradient. Information related to object 150 may include, but is not limited to: compositional information, such as mass and density; spatial information, such as mass distribution and density distribution; relative information, such as associations with environmental information; and the like. For example, a changing gravitational field between gravity gradient detection system 110 and object 150 depends on a distance between gravity gradient detection system 110 and object 150 (which may be known) and a mass of object 150 (which may be unknown), as will be explained further below. Due to relative movement of object 150, the gravitational field will change with respect to time and the relative position of object 150 and gravity gradient detection system 110. Based on the changes in gravitational field with respect to position and time, computing device 120 may determine properties of object 150 related to the detected mass of object 150. In some examples, object 150 may be an absence of an object, such as a cavity or tunnel.

In some examples, computing device 120 is configured to generate an alert based on the change in gravitational field. For example, computing device 120 may produce an alert message indicating that a sensed change in gravitational field caused by relative movement of object 150 exceeds a predefined threshold, requiring further inspection of the object. This may be useful, for example, for detecting presence of dense materials, such as materials used for nuclear weapons.

In some examples, computing device 120 is configured to generate a spatial representation related to a composition of object 150. For example, the change in gravity gradient may include components of the change in gravity gradient along multiple axes, such as a change in a first component of the gravity gradient along an x-axis and a change in a second component of the gravity gradient along a y-axis. Computing device 120 may use the components of the changes in gravity gradient to construct a three-dimensional representation of distributions of mass, density, or other compositional properties of object 150. In some examples, computing device 120 is configured to generate or identify an association between the change in gravity gradient and other environmental information related to object 150. For example, a gravity gradient may be associated with particular geographic location due to a gravitational strength of a particular combination of the Earth's composition at that geographic location. In some examples, computing device 120 may map a gravity gradient with a particular geographic location. In some examples, computing device 120 is configured to correlate the gravity gradient with a geographic location based at least in part on a mapped gravity gradient at that location.

In this way, the gravity gradiometer of gravity gradient detection system 110 may provide technical advantages for detecting gravity gradients, including changes in gravity gradients, and may provide advantageous solutions enabling a variety of uses and applications. For example, due to the high sensitivity of the optical cavity of the gravity gradiometer, the gravity gradiometer may be used to detect extremely small changes in gravitational field caused by object 150, such as gravity gradients of less than 1 eotvos. As another example, due to the compactness of the gravity gradiometer of gravity gradient detection system 110, gravity gradient detection system 110 may include multiple gravity gradiometers arranged in a small footprint array configuration and used to measure multiple components of the gravity gradient at different locations around object 150. For example, gravity gradiometers having a footprint of less than 10 cm by 10 cm or less than 100 $cm^2$, may be realized. As yet another example, due to the mobility of the gravity gradiometer of gravity gradient detection system 110, the gravity gradiometer may be used in mobile applications, such as drone-based mineral searching and topology mapping. Further applications of gravity gradient detection system 110 will be discussed below.

Sensing system 100 may be used in a wide variety of industries for a wide variety of applications including, but not limited to: mineral, oil, and gas exploration; ground penetrating radar; magnetometry; submerged object and/or void detection, such as mine and tunnel detection; nuclear magnetic resonance; navigation, such as deep-sea and GPS-disabled navigation; weapon detection, such as nuclear weapon detection; and other applications involving heavy mass detection. For example, applications that involve identification of a composition of a volume or a relationship of a volume to environmental information may utilize sensing system 100. In some examples, sensing system 100 may be used for a vessel checkpoint, such as a checkpoint to detect a concealed weapon. A concealed weapon may include metals having a high density, such as uranium and plutonium. In this example, gravity gradient detection system 110 is positioned near a channel through which cargo vessels, such as vehicles and shipping containers, may pass. As the cargo vessel passes near gravity gradient detection system 110, gravity gradient detection system 110 detects a change in gravity gradient caused by movement of the cargo vessel. Computing device 120 receives a waveform representing the change in gravity gradient, of signal representing gravity gradient, versus time and/or position. Computing device 120 determines whether an amplitude of the waveform is above a threshold corresponding to a high mass or density of an object. In response to the amplitude of the waveform exceeding the threshold, thereby indicating a high mass or density of an object within the cargo vessel, computing device 120 may flag the cargo vessel for further inspection.

In some examples, sensing system 100 may be used to image and detect a concealed weapon, as in a weapon detection system. In this example, gravity gradient detection system 110 includes a plurality of gravity gradiometers arranged in arrays and positioned above and adjacent to the channel described above to measure different components of a change in gravity gradient during passage of the cargo vessel. As the cargo vessel passes near the arrays of gravity gradiometers, each gravity gradiometer detects a component of a change in gravity gradient caused by movement of the cargo vessel. Computing device 120 receives data from the gravity gradiometers representing the components of the change in gravity gradient, such as a horizontal component and a vertical component perpendicular to movement of the cargo vessel. Computing device 120 processes the data to, for example, create a three-dimensional representation of the cargo vessel and its contents. Computing device 120 outputs the three-dimensional representation onto display 130 as a visual representation. For example, the three-dimensional representation of the cargo vessel may include a three-dimensional model of the mass distribution of the cargo vessel, a density heat map of the cargo vessel overlaid on an image of the cargo vessel, and the like.

In some examples, sensing system 100 may be used in a vehicle navigation system to navigate a GPS-denied area. A particular location on the Earth may have an associated change in gravity gradient for a vessel moving over the particular location, such that the gravity gradients form mapped gravity gradient geographical data. The vessel, such as a submarine, includes gravity gradient detection system 110 having one or more axes, such as horizontal x- and y-axes and a vertical z-axis. Gravity gradient detection system 110 detects a change in gravity gradient along the one or more axes as the vessel travels over the location. Computing device 120 determines a location of the vessel by correlating the change in gravity gradient with a particular location based on the mapped gravity gradient geographical data. Computing device 120 may interface with other systems, such as inertial systems (e.g. accelerometers and gyroscopes) or navigation systems (e.g., location approximations), to determine location of the vessel.

In some examples, sensing system 100 may be used to evaluate land for metals and minerals. In this example, gravity gradient detection system 110 is placed in an airborne vessel and positioned such that the gravity gradiometer has a vertically-oriented axis. The airborne vessel travels over a target area and detect changes in gravitational force of the target area. Computing device 120 receives a gravity gradient waveform representing a change in gravity gradient with geographical position and/or location and determines a density or density signature of portions of the target area that may correspond to a metal or mineral of interest.

Figure 2:
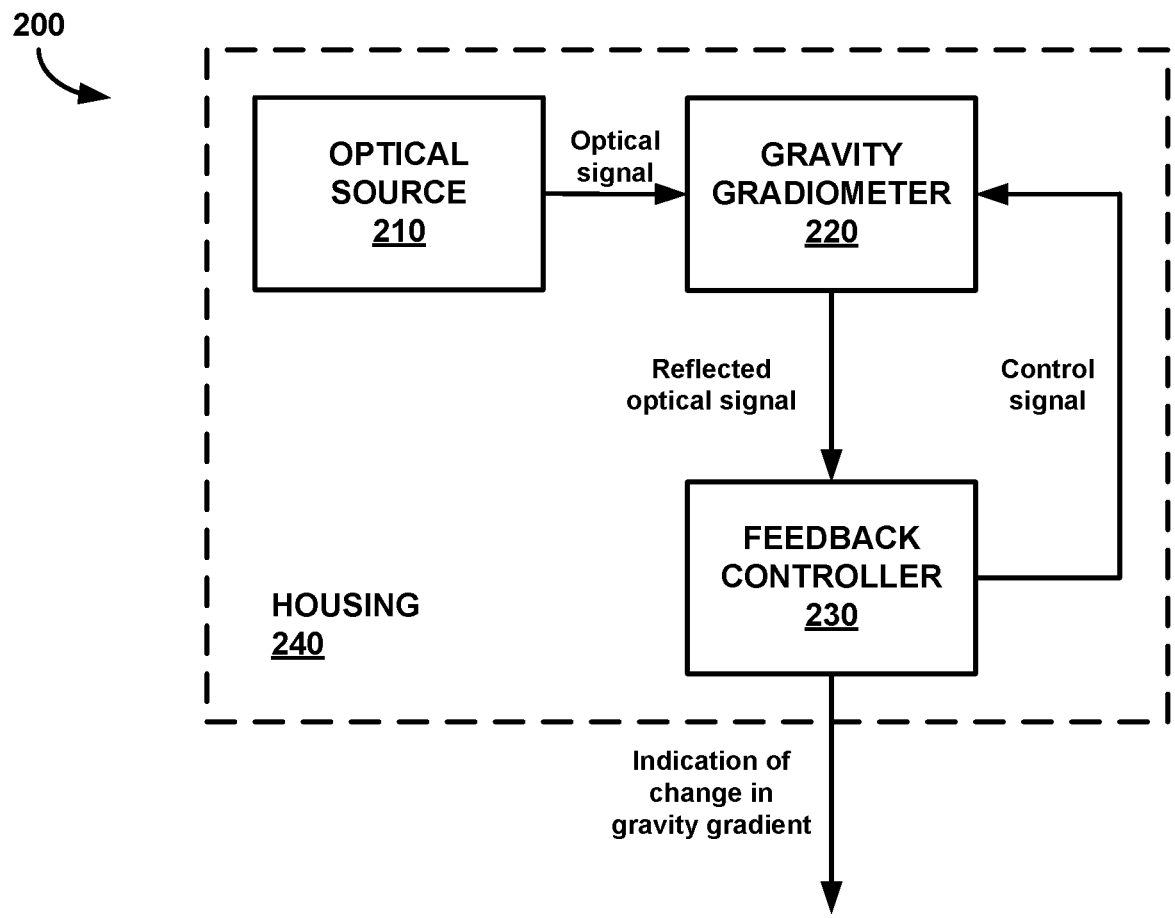
FIG. 2 is a conceptual and schematic block diagram illustrating an example sensing system for measuring a change in gravitational field caused by relative movement of an object, in accordance with embodiments discussed herein.

FIG. 2 is a conceptual and schematic block diagram illustrating an example sensing system 200 for detecting a change in gravity gradient caused by relative movement of an object, in accordance with embodiments discussed herein. In this example, sensing system 200 includes an optical source 210, a gravity gradiometer 220, and a feedback controller 230 contained in a housing 240. Sensing system 200 may be used as, for example, gravity gradient detection system 110 of FIG. 1.

Gravity gradiometer 220 is a compact gravity gradiometer configured to detect a change in gravity gradient with high sensitivity. Gravity gradiometer 220 is optically coupled to optical source 210 and feedback controller 230. For example, gravity gradiometer 220 may be positioned in a line-of-sight, directly or indirectly, of optical source 210 and feedback controller 230. Gravity gradiometer 220 is configured to receive an optical signal from optical source 210 and reflect at least a portion of the optical signal to feedback controller 230 in response to a change in gravity gradient on gravity gradiometer 220. The optical signal may include any visible or non-visible light having a limited optical property, such as wavelength, frequency, phase, and/or polarization. For example, the optical signal may be laser light having a specific wavelength, frequency, and/or phase within a corresponding narrow range or at a particular value.

Gravity gradiometer 220 includes a first mirror and a second mirror. The first mirror and the second mirror are arranged to form an optical cavity having an optical axis. At least one of the first and second mirrors is configured to move along the optical axis, such that the optical axis is substantially parallel to movement of the first and second mirrors. The optical cavity has a length defined by a distance between a reflective surface of the first mirror and a reflective surface of the second mirror. The length of the optical cavity changes as a relative distance between the first mirror and the second mirror changes.

The optical cavity of gravity gradiometer 220 is configured to translate a change in the length of the optical cavity into a measurable reflected optical signal. The optical cavity is configured such that light having a wavelength that is a divisor of the length of the optical cavity (i.e. resonant with the optical cavity) is not substantially reflected and instead admitted into and retained within the cavity between the two mirrors, while light having a wavelength that is not a divisor of the length of the optical cavity (i.e. not resonant with the optical cavity) is reflected. For example, gravity gradiometer 220 may receive a laser optical signal having a frequency that is a resonant frequency (or multiple of) of the optical cavity. As the length of the optical cavity changes, the resonant frequency of the optical cavity shifts. As such, the optical signal is no longer resonant with the optical cavity, and at least a portion of the optical signal is reflected. As another example, as a phase or frequency of the optical signal is modulated, at least a portion of the optical signal is reflected in an oscillating intensity. In this example, the reflected optical signal represents the change in the length of the optical cavity and/or a modulation of a phase or frequency of the optical signal (which may be compensated for, as described in FIG. 6 below).

The first and second mirrors may be any mirrors capable of forming a resonant optical cavity and emitting light having off-resonant wavelengths. Optical cavities that may be used include, but are not limited to, confocal cavities, concentric cavities, parallel cavities, convex/concave cavities, and the like. In some examples, the first and second mirrors are reflective surfaces coupled to an optical medium, such as reflective coatings on a transparent substrate. Each of the first and second mirrors may have a high (R>99%) reflectivity, such that relatively little resonant light is emitted from the optical cavity compared to off-resonant light. In other embodiments, the reflectivity is not high, such as below 99%. In some instances, reflectivity may be reduced to change the finesse of the optical cavity.

In one example, gravity gradiometer 220 is constructed to include a drive and bearing system configured to displace at least one of the first and second mirrors along the optical axis in response to a change in gravity gradient, caused by the changing gravitational field, on the drive and bearing system. In this example, each of the first and second mirrors are coupled to a bearing of the drive and bearing system. Bearings of the drive and bearing system are configured to move along or substantially parallel to (e.g., linearly using a linear bearing or tangentially using a rotary or pendulum bearing) the optical axis in response to the change in gravity gradient. The drive and bearing system is configured to relatively displace the first and second mirrors along the optical axis in response to the change in gravity gradient. For example, a gravitational force between an object and a bearing of gravity gradiometer 220 is represented by the following equation:

$$F = \frac{Gm_1 m_2}{r^2} \quad \text{[Equation 1]}$$

In the above Equation 1, F represents the gravitational force between the object and the bearing, G represents the gravitational constant, $m_1$ represents the mass of the first object, $m_2$ represents a mass of the bearing, and r represents a distance between the object and the bearing.

The drive and bearing system is configured to translate a change in gravity gradient into a change in the length of the optical cavity of gravity gradiometer 220. A change in gravity gradient caused by movement of an object effects a greater change in gravitational field on a first bearing of the drive and bearing system closer to the object than on a second bearing of the drive and bearing system of a similar mass further from the object. For example, an x-component of a gravity gradient caused by the presence of an object may be represented with the following equation:

$$G_{xx} = \frac{\partial g_x}{\partial x} \approx \frac{g_{xp} - g_{xd}}{l} \quad \text{[Equation 2]}$$

In the above Equation 2, $G_{xx}$ represents the gravity gradient caused by the object, $g_{xp}$ represents a gravitational force at the first, proximal bearing, $g_{xd}$ represents a gravitational force at the second, distal bearing, and l represents the distance between the first and second bearing. As such, a change in gravity gradient may cause the drive and bearing system to displace the first mirror greater than the second mirror, thereby creating a relative displacement between the first mirror and the second mirror and, correspondingly, a change in the length of the optical cavity. As explained above, the change in the length of the optical cavity causes the optical signal to become out of resonance with the optical cavity.

In some examples, the length of the optical cavity may be selected according to a variety of factors such as a desired size of sensing system 200, a desired sensitivity of sensing system 200, and the like. In some examples, a shorter length of the optical cavity may be selected so that gravity gradiometer 220 is more compact. For example, multiple instances of sensing system 200 may be used to create an array of gravity gradient detection systems for generating a spatial map of an object or volume, as discussed in FIG. 1. A more compact size may allow for a greater number and/or orientation of sensing systems 200 or may allow for sensing system 200 to be transported and operated while moving, such as on a drone. In some examples, a length of the optical cavity may be less than 10 cm. Additionally or alternatively, for an array having multiple instances of sensing system 200, a greater number of systems in the array may result in a greater sensitivity for the array. As a number of sensing systems 200 in an array increases, a sensitivity of the array may increase, such as an increase proportional to a square root of the number of systems in the array (i.e. $n^{1/2}$).

In some examples, a longer length of the optical cavity may be selected so that gravity gradiometer 220 is more sensitive to changes in gravitational force. For example, as shown in Equation 1, as a distance of a bearing from the object or volume increases, the gravitational force on the bearing from the object or volume decreases. By increasing a length of the optical cavity, and correspondingly a distance between the bearings of the drive and bearing system, gravity gradiometer 220 may detect greater differences in gravitational force between the bearings of the drive and bearing system.

The drive and bearing system may include any displacement mechanism capable of displacing one or more bearings in response to a change in gravity gradient and translating that displacement to the first and/or second mirrors of the optical cavity. In some examples, the drive and bearing system is configured to linearly displace the bearings in response to a change in gravity gradient on the drive and bearing system. For example, the drive and bearing system may be configured to linearly displace at least one of the first and second mirrors along the optical axis in response to a change in gravity gradient. In some examples, the drive and bearing system is configured to non-linearly displace the bearings in response to a change in gravity gradient on the drive and bearing system, such as along an arc movement caused by a torsional bearing. Displacement mechanisms that may be used include, but are not limited to, levitating mechanisms, such as levitating linear and torsional bearings; suspension mechanisms, such as pendulum bearings; counterbalanced pivoting mechanisms; and the like.

In the example of FIG. 2, gravity gradiometer 220 is electrically coupled to feedback controller 230 and configured to receive a control signal from feedback controller 230. For example, gravity gradiometer 220 may be wired to a current source of feedback controller 230. The drive and bearing system of gravity gradiometer 220 is configured to exert a control force on at least one of the bearings, in response to receiving the control signal, to maintain resonance of the optical cavity. The control signal represents the control force on the drive and bearing system that maintains and/or restores resonance of the optical cavity and, correspondingly, represents a measurement of the gravity gradient. For example, when the optical cavity is at resonance, the control signal causes the drive and bearing system to maintain the first and second mirrors at the length of the optical cavity. When the optical cavity is not at resonance, such as due to relative movement of an object, the control signal causes the drive and bearing system to displace at least one of the first or second mirrors along the optical axis to restore resonance. The corresponding control signal represents the new control force required to maintain resonance based on the new position of the object. For example, the control signal may cause the drive and bearing system to increase or decrease a control force on at least one of the first and second bearings of the drive and bearing system resulting in displacement of the first and/or second bearings and, correspondingly, displacement of the first and/or second mirrors.

In some examples, the drive and bearing system may be configured to independently control displacement of each of the first and second mirrors coupled to the bearings of the drive and bearing system based on the control signal. In these examples, the drive and bearing system is configured to receive a plurality of control signals and displace each of the first and second mirrors based on at least one of the plurality of control signals. For example, the drive and bearing system is configured to displace a first bearing to a first displacement based on a first control signal and a second bearing to a second displacement based on a second control signal. As such, the drive and bearing system controls a relative displacement between the bearings based on the control signals.

The drive and bearing system may use any control mechanism capable of exerting a control force on one or more bearings of the drive and bearing system in response to a control signal to maintain the one or more bearings at a distance or displace the one or more bearings and translate that displacement to the first and/or second mirrors of the optical cavity. Control forces that may be used to move the bearings include, but are not limited to, actuated mechanical forces, magnetic forces, elastic forces, electrostatic forces, and the like. In some examples, the drive and bearing system uses a magnetic control mechanism to displace the one or more bearings of the drive and bearing system in response to a current signal. For example, the drive and bearing system may use electromagnetic coils controlled by a current signal to generate a magnetic field. Such magnetic control may be simple and/or compatible with other magnetic designs of the system. In some examples, the drive and bearing system uses an electrostatic control mechanism to displace the one or more bearings of the drive and bearing system in response to a current signal. For example, the drive and bearing system may use a metal pad controlled by a current signal to electrostatically attract or repel the bearings of the drive and bearing system. Such electrostatic control may use low power and low heating, and may be controlled through voltage. For example, the metal pad may not heat up and may have more consistent properties irrespective of current strength. In other examples, the drive and bearing system may use eddy currents or photon pressure. For example, eddy current control may have a smooth control force and a large range of motion. As another example, photon pressure control may by non-contact.

In some examples, the drive and bearing system includes a low friction mechanism for bearing displacement within the drive and bearing system. For example, a sensitivity of gravity gradiometer 220 may be improved if the bearings of the drive and bearing system may displace freely without having to overcome a high static friction coefficient. Low friction mechanisms that may be used include, but are not limited to, levitating systems, pendulum systems, suspended systems, torsional systems, and the like. Drive and bearing systems may be described in more detail in FIGS. 3-5 below.

The components of gravity gradiometer 220 may be contained in a housing. The components of gravity gradiometer 220 may be relatively small, such that an overall volume of gravity gradiometer 220 is small. Dimensions of gravity gradiometer 220 may be selected based on a variety of factors including, but not limited to, sensitivity, weight, and the like. For example, gravity gradiometer 220 may be limited in size by the length of the optical cavity, which may have a length of less than 10 cm. In some examples, gravity gradiometer 220 has a volume less than about 0.1 m$^3$, such that gravity gradiometer 220 may be portable by a person, unmanned aerial vehicle, or other entity with a limited carrying capacity.

The components of sensing system 200 may be contained in housing 240. Housing 240 may be any structure configured to physically couple, directly or indirectly, optical source 210, gravity gradiometer 200, and feedback controller 230 into a single physical unit or component. For example, optical source 210, gravity gradiometer 220, and feedback controller 230 may be physically coupled to housing 240 in a fixed position relative to each other component. As another example, optical source 210 and feedback controller 230 may be physically coupled, directly or indirectly, to gravity gradiometer 220, such as optical source 210 physically coupled to an optical inlet of gravity gradiometer 220 and/or feedback controller 230 physically coupled to an optical outlet of gravity gradiometer 220. By including sensing system 200 in housing 240, sensing system 200 may be operable as a rigid unit and/or transportable as a single unit.

In other examples, any of optical source 210, gravity gradiometer 220, and feedback controller 230 may be assembled as separate components, with or without housing 240. In some examples, optical source 210 and gravity gradiometer 220 may be a single unit that is coupled to a separate feedback controller 230. For example, feedback controller 230 may be configured to detect a component of a change in gravity gradient of one or more gravity gradiometers, such that multiple gravity gradiometers may be coupled to feedback controller 230. In some examples, gravity gradiometer 220 and feedback controller 230 may be a single unit that is coupled to a separate optical source 210. For example, optical source 210 may be configured to emit an optical signal to one or more gravity gradiometers, such that the optical signal may have properties that are more consistent for each gravity gradiometer. In some examples, optical source 210 and feedback controller 230 may be a single unit that is coupled to a separate gravity gradiometer 220. For example, gravity gradiometer 220 may have multiple optical cavities and drive and bearing systems configured to displace the optical cavities, such that gravity gradiometer 220 may respond to more than one component of a change in gravity gradient.

Figure 5:
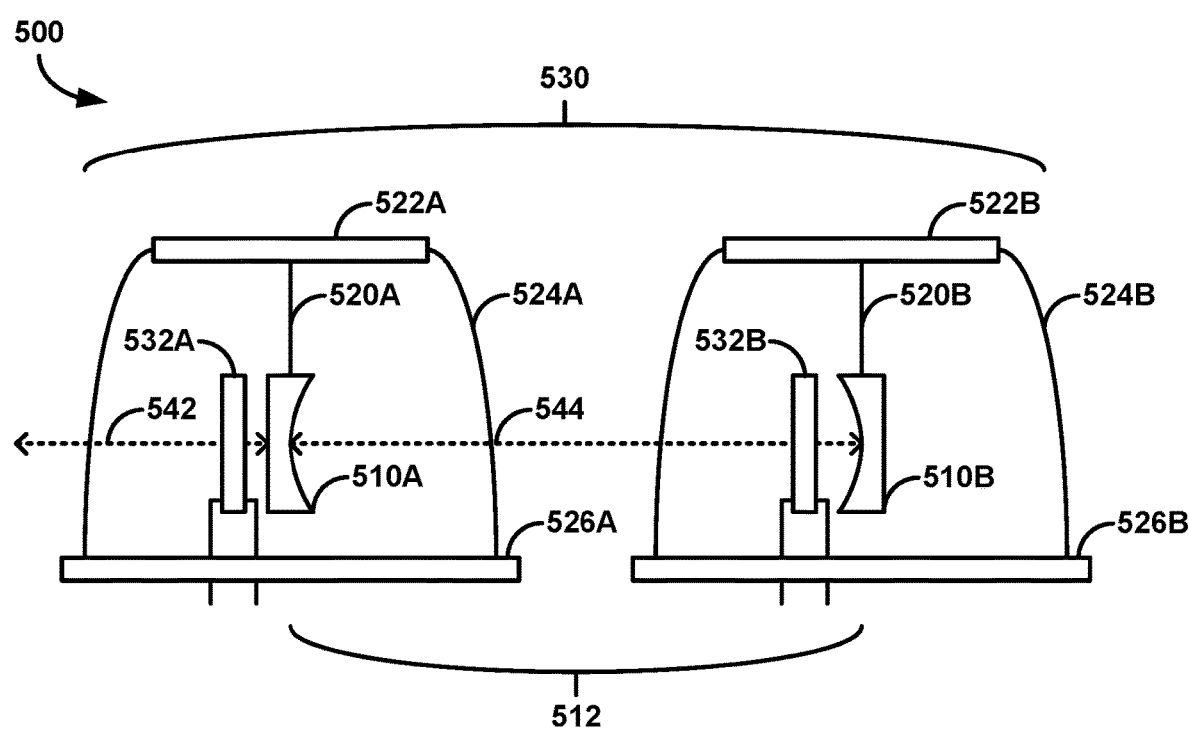
FIG. 5 is a conceptual cross-sectional diagram illustrating an example gravity gradiometer that includes pendulum bearings for detecting a change in gravitational field, in accordance with embodiments discussed herein.

In some examples, sensing system 200 includes components configured to reduce noise to gravity gradiometer 220, such as by using active and/or passive vibration cancellation. For example, vibrations and other forms of electronic and physical noise may cause additional relative displacement of the optical cavity or other forms of error associated with detecting the change in gravity gradient. In some examples, sensing system 200 includes one or more components for dampening noise, such as vibrations, from a source external to gravity gradiometer 220. For example, gravity gradiometer 220 may be positioned on a vibration dampening pad, such as shown in FIG. 5, to reduce the amplitude of vibrations that may be transmitted to the drive and bearing system of gravity gradiometer 220. In some examples, sensing system 200 includes one or more components for compensating for noise in measurements, such as portions of signals attributable to vibration, picked up by gravity gradiometer 220. For example, sensing system 200 may include vibration detectors, such as accelerometers, configured to measure vibrational noise near gravity gradiometer 220 and filters, such as Weiner filters, configured to adjust the detected error signal based on the measured vibrational noise.

As discussed above, gravity gradiometer 220 is configured to receive an optical signal from optical source 210. Optical source 210 is in optical communication with gravity gradiometer 220 and configured to emit an optical signal at a resonant wavelength of the optical cavity of gravity gradiometer 220. Optical source 210 may include instrumentation for tuning properties, such as frequency and phase, of the optical signal, such as through manual tuning parameters or electronic tuning parameters from, for example, feedback controller 230.

As discussed above, gravity gradiometer 220 is configured to reflect at least a portion of the optical signal to feedback controller 230 in response to a change in a length of the optical cavity. Feedback controller 230 is configured to receive the reflected optical signal from gravity gradiometer 220. For example, feedback controller 230 may include an optical detector configured to receive the reflected optical signal and convert the reflected optical signal to an electrical signal based on the reflected optical signal.

Feedback controller 230 is configured to determine a control signal based on the reflected optical signal. The reflected optical signal represents the relative displacement between the first mirror and the second mirror that results in the optical cavity being out of resonance with the optical signal. To return the optical cavity to resonance with the optical signal, feedback controller 230 is configured to generate the control signal for the drive and bearing system that corresponds to a reduction or reversal of the change in relative displacement of the first and/or second mirrors. For example, the optical cavity may have a default state, such as established upon initialization of gravity gradiometer 220, that includes the first mirror at a first position and a second mirror at a second position. In response to displacement of the first and/or second mirrors—detected by feedback controller 230 as a reflected optical signal corresponding to the relative displacement of the first and/or second mirrors—feedback controller 230 is configured to generate a control signal that will return the first and/or second mirrors to the default state. The control signal is configured such that a return to resonance by the optical cavity corresponds to a return to the default state by the first and second mirrors. In some examples, the control signal may include a plurality of control signals configured to effectuate the reduction or reversal of the displacement of the first and/or second mirrors. For example, the control signal may include a first control signal for a distal bearing of the drive and bearing system and a second, stronger control signal for a proximal bearing of the drive and bearing system.

Feedback controller 230 is electrically coupled to gravity gradiometer 220 and configured to output the control signal to gravity gradiometer 220. For example, feedback controller 230 may include a current source configured to output one or more current signals that correspond to the control signal. The control signal is configured to cause the drive and bearing system of gravity gradiometer 220 to reduce the displacement of each of the first mirror and/or the second mirror which, in turn, reverses the relative displacement between the first and second mirrors and returns the optical cavity to resonance. The strength of the control signal is related to the gravity gradient on gravity gradiometer 220 and the change in the control signal due to the reflected optical signal is related to the change in gravity gradient. For example, as the change in gravity gradient on gravity gradiometer 220 increases, the control force exerted by the drive and bearing system to return the optical cavity to resonance and/or its default state increases. The control force for each bearing is equal to and opposite the gravitational force on each bearing, such that the control signal that is configured to cause the drive and bearing system to create the control force(s) represents the changed gravity gradient exerted on the bearings of the drive and bearing system.

Feedback controller 230 is highly responsive to displacement of the first and second mirrors, such that actual displacement of the first and second mirrors due to a change of gravitational force may be small and incremental. For example, as an object or volume moves closer to gravity gradiometer 220, feedback controller 230 differentially and/or incrementally increases or decreases the strength of the control signal to gravity gradiometer 220 in response to small detected increases or decreases in the relative displacement of the first and second mirrors. In some examples, the control signal strength is proportionate to the intensity of the reflected optical signal. For example, as the intensity of the reflected optical signal increases, the control signal strength may correspondingly increase to decrease the intensity of the reflected optical signal at a higher rate.

While not shown in FIG. 2, in some examples, feedback controller 230 is communicatively coupled to a computing device, such as computing device 120 of FIG. 1. In these examples, feedback controller 230 is configured to output an indication of the change in gravity gradient to the computing device, such as the control signal to gravity gradiometer 220. For example, as explained above, the control signal is related to the control force exerted by the drive and bearing system of gravity gradiometer 220 to counter the displacement of the bearings caused by the change in gravity gradient.

In this way, sensing system 200 can be configured to provide high sensitivity to changes in gravity gradient. Even small changes in gravity gradient may, for example, create slight changes in the length of the optical cavity of gravity gradiometer 220. However, the reflected optical signal corresponding to the very small change in length is detectable by feedback controller 230 due to the high sensitivity of the resonant frequency of optical cavity in response to changes in optical cavity length. For example, feedback controller 230 may detect a reflected optical signal that corresponds to a change in a length of the optical cavity less than 0.01 nanometer. In some examples, the sensitivity of sensing system 200 is less than 1 eotvos (E), such as less than 0.1 E.

Sensing system 200 may also have a reduced interference from vibration compared to gravity measurement systems that detect a gravitational force, rather than a gravity gradient. For example, a vibration that affects the bearings of gravity gradiometer 220 may affect each bearing of gravity gradiometer 220 substantially equally. As such, the relative displacement of the bearings may be very small compared to an absolute displacement of the bearings.

As discussed above, compact, highly sensitive gravity gradiometers as discussed herein may include a variety of drive and bearing systems for displacing mirrors of the optical cavity in response to a change in gravity gradient and/or a control signal from a feedback controller. FIGS. 3A, 3B, 4, and 5 are conceptual diagrams illustrating various example gravity gradiometers that include different drive and bearing systems for detecting a gravity gradient. The gravity gradiometers of FIGS. 3A-5 may be used, for example, as gravity gradiometer 220 of FIG. 2.

FIGS. 3A-D and 4A-C are conceptual diagrams illustrating example gravity gradiometers that use levitating diamagnetic bearing systems. Diamagnetic levitation is a form of magnetic contrast levitation which levitates materials, such as pyrolytic graphite, that have lower magnetic susceptibility than the surrounding air or vacuum.

Figure 3A:
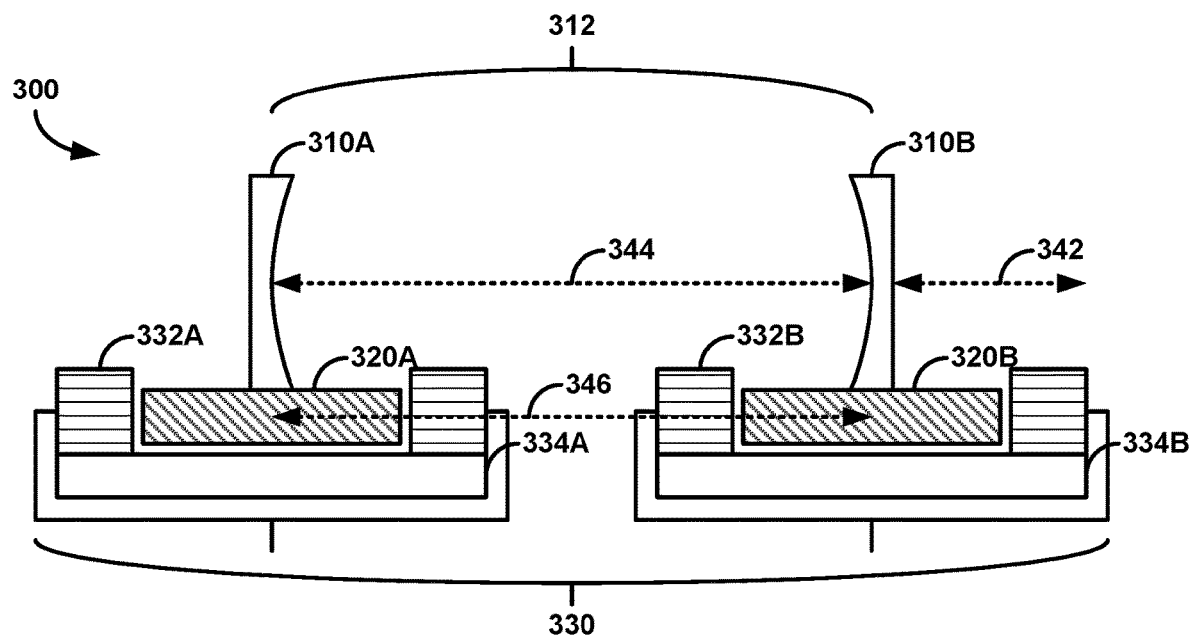
FIG. 3A is a conceptual cross-sectional diagram illustrating an example gravity gradiometer that includes linear levitating bearings for detecting a change in gravitational field oriented in a horizontal direction, in accordance with embodiments discussed herein.

FIG. 3A is a conceptual cross-sectional diagram illustrating an example gravity gradiometer 300 that includes linear levitating bearings for detecting a horizontal component of a change in gravity gradient, in accordance with embodiments discussed herein. Gravity gradiometer 300 may be oriented such that a direction of the Earth's gravitational force is perpendicular to an optical axis 344 of gravity gradiometer 300.

Gravity gradiometer 300 includes a confocal mirror 310A and a confocal mirror 310B that form a confocal optical cavity 312 having an optical axis 344. Optical cavity 312 is configured to receive an optical signal 342 at a resonant wavelength and reflect optical signal 342 at off-resonant wavelengths in response to a change in a length of optical cavity 312.

Gravity gradiometer 300 includes a drive and bearing system 330. Drive and bearing system 330 is configured to displace confocal mirror 310A and confocal mirror 310B (referred to collectively as "confocal mirrors 310") along optical axis 344 in response to a change in gravity gradient. Drive and bearing system 330 includes a diamagnetic mass 320A coupled to confocal mirror 310A and a diamagnetic mass 320B coupled to confocal mirror 310B. Diamagnetic mass 320A and diamagnetic mass 320B (referred to collectively as "diamagnetic masses 320") are configured to differentially move respective confocal mirrors 310 in response to the change in gravity gradient to create a change in a length of optical cavity 312. In some examples, diamagnetic masses 320 may be diamagnetic pyrolytic graphite. Diamagnetic masses 320 may be composed of any diamagnetic material capable of magnetic levitation and control. For example, diamagnetic masses 320 may include graphite cylinders laser-bonded to respective confocal mirrors 310. In some examples, diamagnetic masses 320 may have a weight between about 0.1 gram and about 10 kg. Diamagnetic masses 320 may be especially suitable for a compact, sensitive system due to their relatively light weight and high durability. Diamagnetic masses 320 may be small, such as less than 10 grams, and strong and rigid, such as having a thickness of at least 0.1 mm.

In the example of FIG. 3A, drive and bearing system 330 is configured to levitate diamagnetic masses 320. Drive and bearing system 330 includes permanent magnets 334A and 334B (referred to collectively as "permanent magnets 334"). Permanent magnets 334 are configured to generate a stabilizing magnetic force to levitate respective diamagnetic masses 320. Magnetic levitation, such as produced by permanent magnets 334, may be more stable and/or less noisy compared to other levitating alternatives, such as electrostatic or aerodynamic levitation.

In the example of FIG. 3A, drive and bearing system 330 is configured to displace diamagnetic masses 320 in response to a current signal. Drive and bearing system 330 includes a set of electromagnets 332A proximate to diamagnetic mass 320A and a set of electromagnets 332B proximate to diamagnetic mass 320B. The set of electromagnets 332A and the set of electromagnets 332B (referred to collectively as "sets of electromagnets 332") are configured to differentially move respective diamagnetic masses 320 in response to current signals. The current signals represent a change in relative current to the sets of electromagnets 332. The current signals are based on a reflected optical signal corresponding to a change in a length of optical cavity 312. In response to receiving the current signals, the sets of electromagnets 332 reverse the change in the length of optical cavity 312 by reversing the differential movement of diamagnetic masses 320 to attempt to continuously maintain a specified length of optical cavity 312.

Figure 3B:
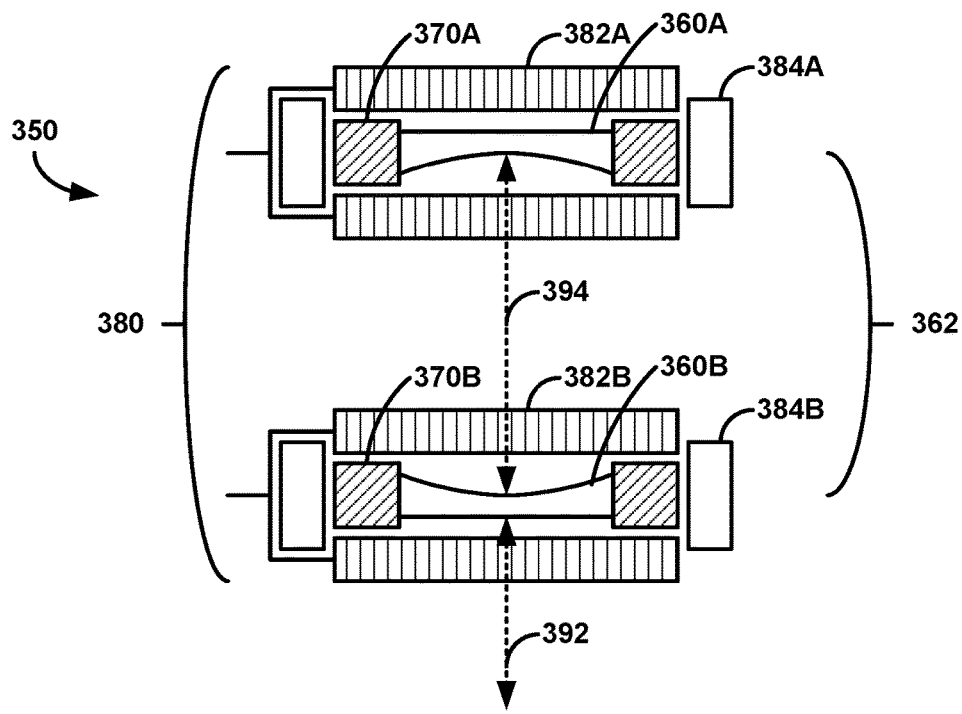
FIG. 3B is a conceptual cross-sectional diagram illustrating an example gravity gradiometer that includes levitating bearings for detecting a change in gravitational field oriented in a vertical direction, in accordance with embodiments discussed herein.

FIG. 3B is a conceptual cross-sectional diagram illustrating an example gravity gradiometer 350 that includes levitating bearings for detecting a vertical component of a change in gravity gradient, in accordance with embodiments discussed herein. Gravity gradiometer 350 may be oriented such that a direction of the Earth's gravitational force is parallel to an optical axis 394 of gravity gradiometer 350. Various components of FIG. 3B may have similar functions as components of FIG. 3A. For example, confocal mirrors 310A and 310B, optical cavity 312, drive and bearing system 330, optical signal 342, optical axis 344, diamagnetic masses 320A and 320B, sets of electromagnets 332A and 332B, and permanent magnets 334A and 334B may operate similarly to confocal mirrors 360A and 360B (referred to collectively as "confocal mirrors 360"), optical cavity 362, drive and bearing system 380, optical signal 392, optical axis 394, diamagnetic masses 370A and 370B (referred to collectively as "diamagnetic masses 370"), sets of electromagnets 382A and 382B (referred to collectively as "sets of electromagnetics 382"), and permanent magnets 384A and 384B (referred to herein as "permanent magnets 384").

In the example of FIG. 3B, the sets of electromagnets 382 are configured to levitate diamagnetic masses 370, as the optical axis 394 is in a direction of gravity. As such, permanent magnets 384 generate a transverse stabilizing magnetic field, in contrast with permanent magnets 334 of FIG. 3A, which generate a levitating magnetic field.

Figure 3C:
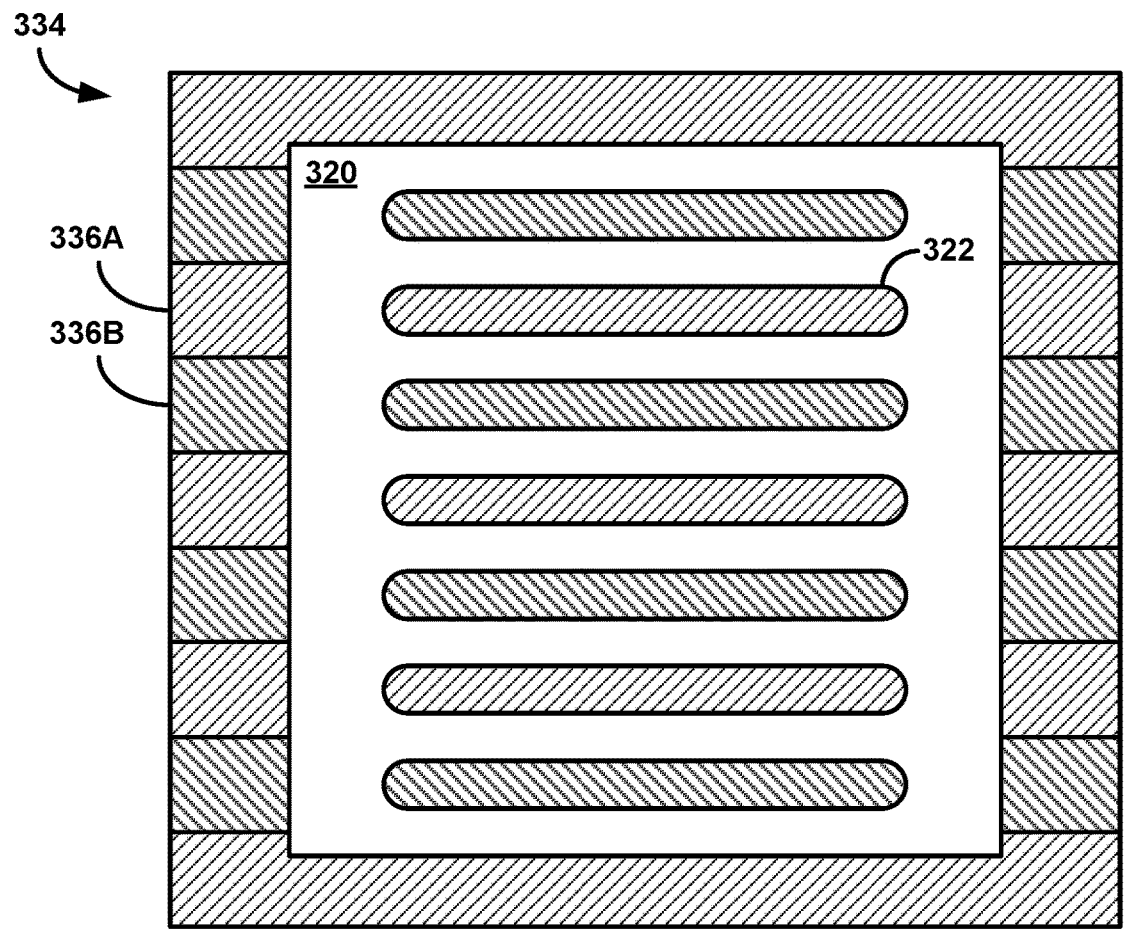
FIG. 3C is a conceptual, top-view diagram illustrating an example levitating system including a diamagnetic mass and a permanent magnet, in accordance with embodiments discussed herein.
Figure 3D:
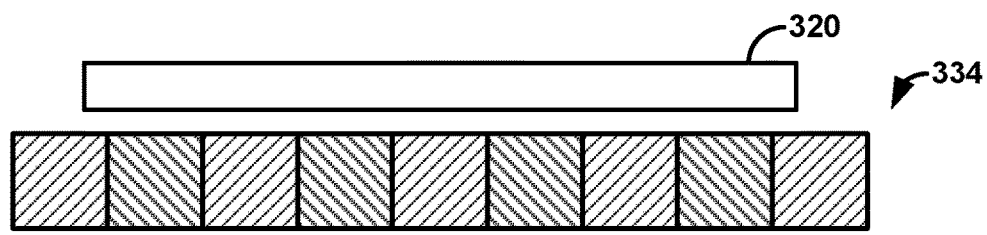
FIG. 3D is a conceptual, side-view diagram illustrating the example levitating system of FIG. 3C, in accordance with embodiments discussed herein.

FIG. 3C is a conceptual, top-view diagram illustrating an example levitating system including one of diamagnetic masses 320 and one of permanent magnets 334, while FIG. 3D is a conceptual, side-view diagram illustrating the example levitating system of FIG. 3C in accordance with embodiments discussed herein. Permanent magnet 334 includes elongated magnets of alternating first polarity 336A and second polarity 336B that are elongated to improve compliance parallel to the optical axis. For example, each elongated magnet may have a length of 10 mm, a width of 4.5 mm, and a height of 4.5 mm. Permanent magnet 334 may guide diamagnetic mass 320 parallel to the optical axis but may resist motion along other axes. Diamagnetic mass 320 may have elongated slots 322 that improve sensitivity of diamagnetic mass 320 to movement along the optical axis and increase stiffness in other directions. For example, each elongated slot 322 may have a width of 2.25 mm and a length of 30 mm. As another example, diamagnetic mass 320 may have a width of 33.75 mm, length of 33.75 mm, and height of 1.3 mm.

By using a levitating diamagnetic bearing system, the bearing system may be more compact, durable, and/or sensitive to a change in gravity gradient than a drive and bearing system that does not use levitation. Sensitivity for the gradiometer or other mechanical sensors may be dependent on the mechanical resonance frequency of the masses, such that the lower the resonance frequency, the less stiff the bearing and the higher the sensitivity. However, making very low stiffness bearings is difficult using traditional flexure (spring or bending) bearings without making them larger and/or more delicate (less robust and more prone to breaking). As such, the use of diamagnetic levitation makes the system more robust and compact without sacrificing sensitivity.

While FIGS. 3A-D have been discussed with respect to solid magnets, similar designs may also levitate with magnetic liquids such as ferrofluids or paramagnetic salt solutions. Instead of air or vacuum surrounding the levitated object, a ferro or paramagnetic liquid with higher susceptibility than the levitated object may be used. In this example, the levitated object may be diamagnetic or may be other materials as long as its magnetic susceptibility is lower than the surrounding magnetic liquid. The use of magnetic liquids may require additional liquid containment structures (not shown). Magnetic liquid versions of the gradiometer may levitate more mass with larger gaps. Some magnetic liquids, such as water solutions of manganese sulfate ($MnSO_4$) salts, are fairly transparent to optical wavelengths.

Figure 4A:
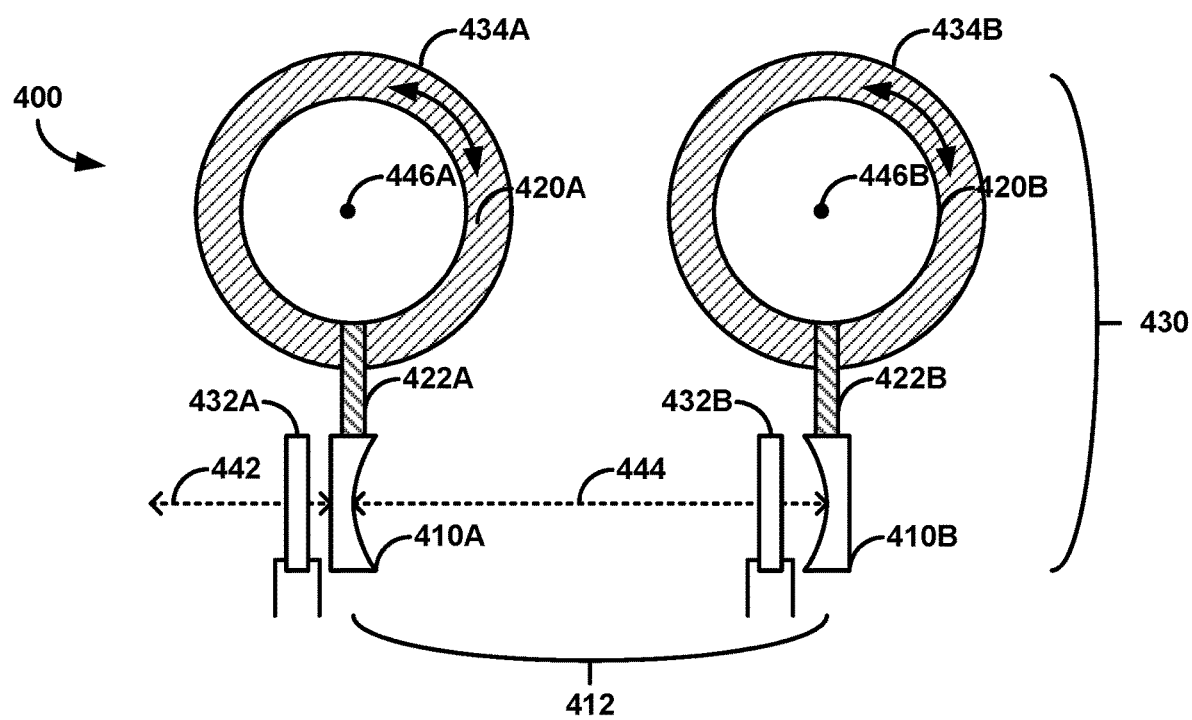
FIG. 4A is a conceptual, top-view diagram illustrating an example gravity gradiometer that includes torsional levitating bearings for detecting a change in gravitational field, in accordance with embodiments discussed herein.

FIG. 4A is a conceptual, top-view diagram illustrating an example gravity gradiometer 400 that includes torsional levitating bearings for detecting a change in gravity gradient, in accordance with embodiments discussed herein. Gravity gradiometer 400 includes a confocal mirror 410A and a confocal mirror 410B (referred to collectively as "confocal mirrors 410") that form a confocal optical cavity 412 having optical axis 444. Optical cavity 412 is configured to receive an optical signal 442 at a resonant wavelength and reflect optical signal 442 at off-resonant wavelengths in response to a change in a length of optical cavity 412.

Gravity gradiometer 400 includes a drive and bearing system 430. Drive and bearing system 430 is configured to displace confocal mirrors 410 substantially along optical axis 444 in response to a change in gravity gradient. Drive and bearing system 430 includes a diamagnetic torsional mass 420A and a diamagnetic torsional mass 420B (referred to collectively as "diamagnetic torsional masses 420"). Each of diamagnetic torsional masses 420 is constrained to pivot around a respective bearing axis 446A and 446B (referred to collectively as "bearing axes 446"). Confocal mirror 410A is coupled to diamagnetic torsional mass 420A through bearing arm 422A and confocal mirror 410B is coupled to diamagnetic torsional mass 420B through bearing arm 422B. Confocal mirrors 410 are configured to pivot around a respective bearing axes 446 in response to the change in gravity gradient to create a change in a length of optical cavity 412.

In the example of FIG. 4A, drive and bearing system 430 is configured to levitate diamagnetic torsional masses 420. Drive and bearing system 430 includes permanent magnets 434A and 434B (referred to collectively as "permanent magnets 434"). Permanent magnets 434 are configured to generate a stabilizing magnetic force to levitate respective diamagnetic torsional masses 420.

In the example of FIG. 4A, drive and bearing system 430 is configured to displace confocal mirrors 410 in response to a current signal. Drive and bearing system 430 includes a set of first electromagnets 432A proximate to first confocal mirror 410A and second electromagnets 432B proximate to second confocal mirror 410B. The set of first electromagnets 432A and second electromagnets 432B (referred to collectively as "sets of electromagnets 432") are configured to differentially move respective confocal mirrors 410 in response to current signals. The current signals are based on a reflected optical signal corresponding to a change in a length of optical cavity 412, such as described in FIGS. 3A and 3B. In response to receiving the current signals, the sets of electromagnets 432 may reduce the change in the length of optical cavity 412 by reversing the differential movement of confocal mirrors 410.

Figure 4B:
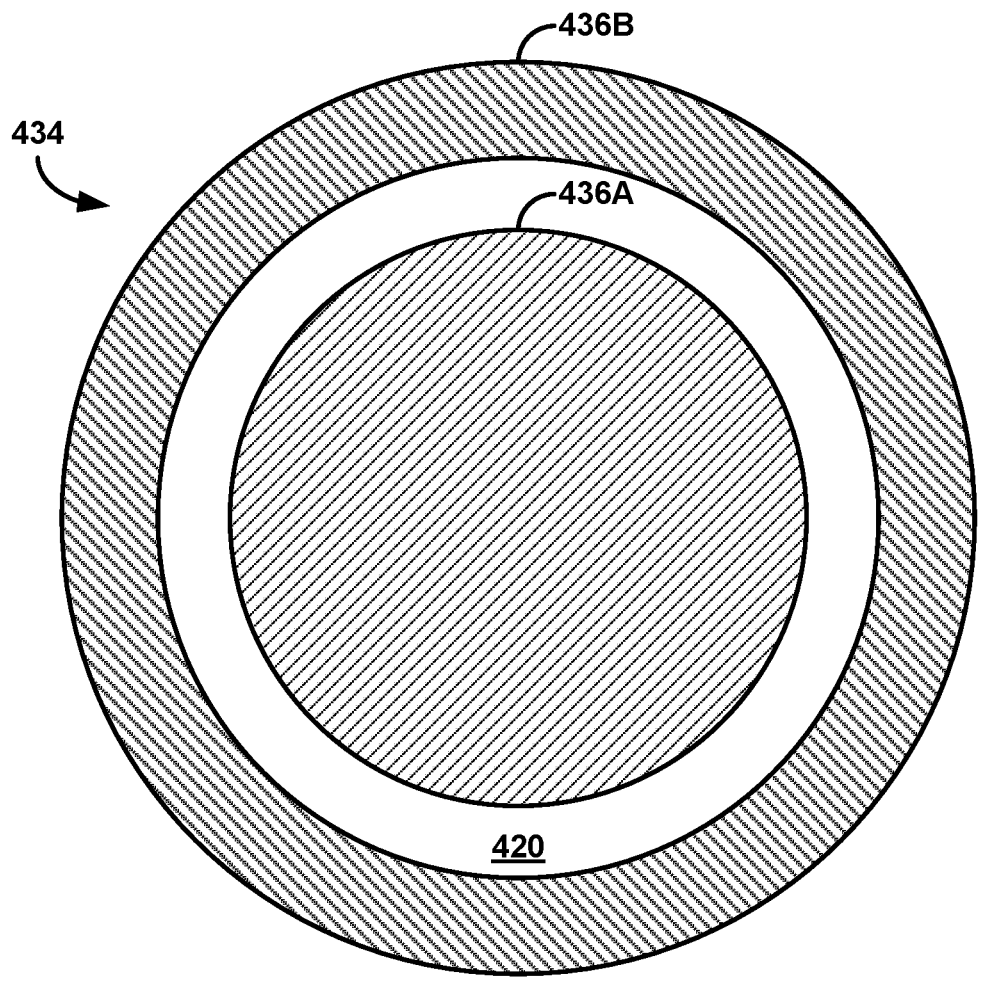
FIG. 4B is a conceptual, top-view diagram illustrating an example torsional levitating system including a diamagnetic mass and a permanent magnet, in accordance with embodiments discussed herein.
Figure 4C:
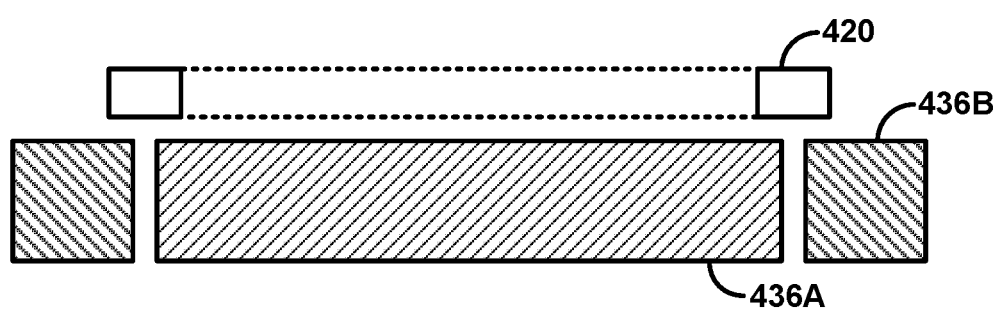
FIG. 4C is a conceptual cross-sectional diagram illustrating the example torsional levitating system of FIG. 4B, in accordance with embodiments discussed herein.

FIG. 4B is a conceptual, top-view diagram illustrating an example torsional levitating system including one of diamagnetic torsional masses 420 and one of permanent magnets 434, while FIG. 4C is a conceptual cross-sectional diagram illustrating the example torsional levitating system of FIG. 4B, in accordance with embodiments discussed herein. Diamagnetic torsional mass 420 may be a diamagnetic ring, such as a pyrolytic graphite ring. For example, diamagnetic torsional mass 420 may have an inner diameter of 21.9 mm, an outer diameter of 28.9 mm, and a height of 1.25 mm. Permanent magnet 434 may include a circular magnet of a first polarization 436A surrounded by a permanent magnet of a second polarization 436B.

By using a torsional drive and bearing system, the bearing of the drive and bearing system may be less noisy than a drive and bearing system that does not use torsion. For example, bearing arm 422 may be sufficiently long such that each respective confocal mirror 410 may be more sensitive to small forces on a respective bearing arm 422.

FIG. 5 is a conceptual, cross-sectional diagram illustrating an example gravity gradiometer 500 that includes pendulum bearings for detecting a change in gravity gradient, in accordance with embodiments discussed herein. Gravity gradiometer 500 may be used, for example, as gravity gradiometer 220 of FIG. 2. Gravity gradiometer 500 includes a first confocal mirror 510A and a second confocal mirror 510B (referred to collectively as "confocal mirrors 510") that form a confocal optical cavity 512 having optical axis 544. Optical cavity 512 is configured to receive an optical signal 542 at a resonant wavelength and reflect optical signal 542 at off-resonant wavelengths in response to a change in a length of optical cavity 512.

Gravity gradiometer 500 includes a drive and bearing system 530. Drive and bearing system 530 is configured to displace confocal mirrors 510 along optical axis 544 in response to a change in gravity gradient. Drive and bearing system 530 includes a first pendulum bearing 520A and a second pendulum bearing 520B (referred to collectively as "pendulum bearings 520"). Each of pendulum bearings 520 pivots from a respective pendulum beam 522A and 522B (referred to collectively as "pendulum beams 522") in response to a change in gravity gradient. First confocal mirror 510A is coupled to first pendulum bearing 520A and second confocal mirror 510B is coupled to second pendulum bearing 520B. Confocal mirrors 510 are configured to pivot around respective pendulum beams 522 in response to the change in gravity gradient to create a change in a length of optical cavity 512.

In the example of FIG. 5, drive and bearing system 530 is configured to suspend confocal mirrors 510 from respective pendulum beams 522 through pendulum bearings 520. Each of pendulum beams 522 includes respective supports 524A and 524B (referred to collectively as "supports 524"). Supports 524 are configured to insulate respective pendulum beams 522A and 522B from vibrations. For example, each of supports 524 may dampen vibrations received by gravity gradiometer 500 by limiting transmission of the vibrations to confocal mirrors 510.

In the example of FIG. 5, drive and bearing system 530 is configured to displace confocal mirrors 510 in response to a current signal. Each of confocal mirrors 510 include a diamagnetic mass (not shown) responsive to a magnetic field. Drive and bearing system 530 includes a set of electromagnets 532A proximate to confocal mirror 510A and electromagnets 532B proximate to confocal mirror 510B. The sets of electromagnets 532A and electromagnets 532B (referred to collectively as "sets of electromagnets 532") are configured to differentially move respective confocal mirrors 510 in response to current signals. The current signals are based on a reflected optical signal corresponding to a change in a length of optical cavity 512. In response to receiving the current signals, the sets of electromagnets 532 reduce the change in the length of optical cavity 512 by reversing the differential movement of confocal mirrors 510.

By using a pendulum drive and bearing system, the bearing of the drive and bearing system may be less noisy than a drive and bearing system that does not use torsion. For example, pendulum bearings 520 and pendulum beams 522 may provide better isolation of confocal mirrors 510 from vibrations.

Figure 6:
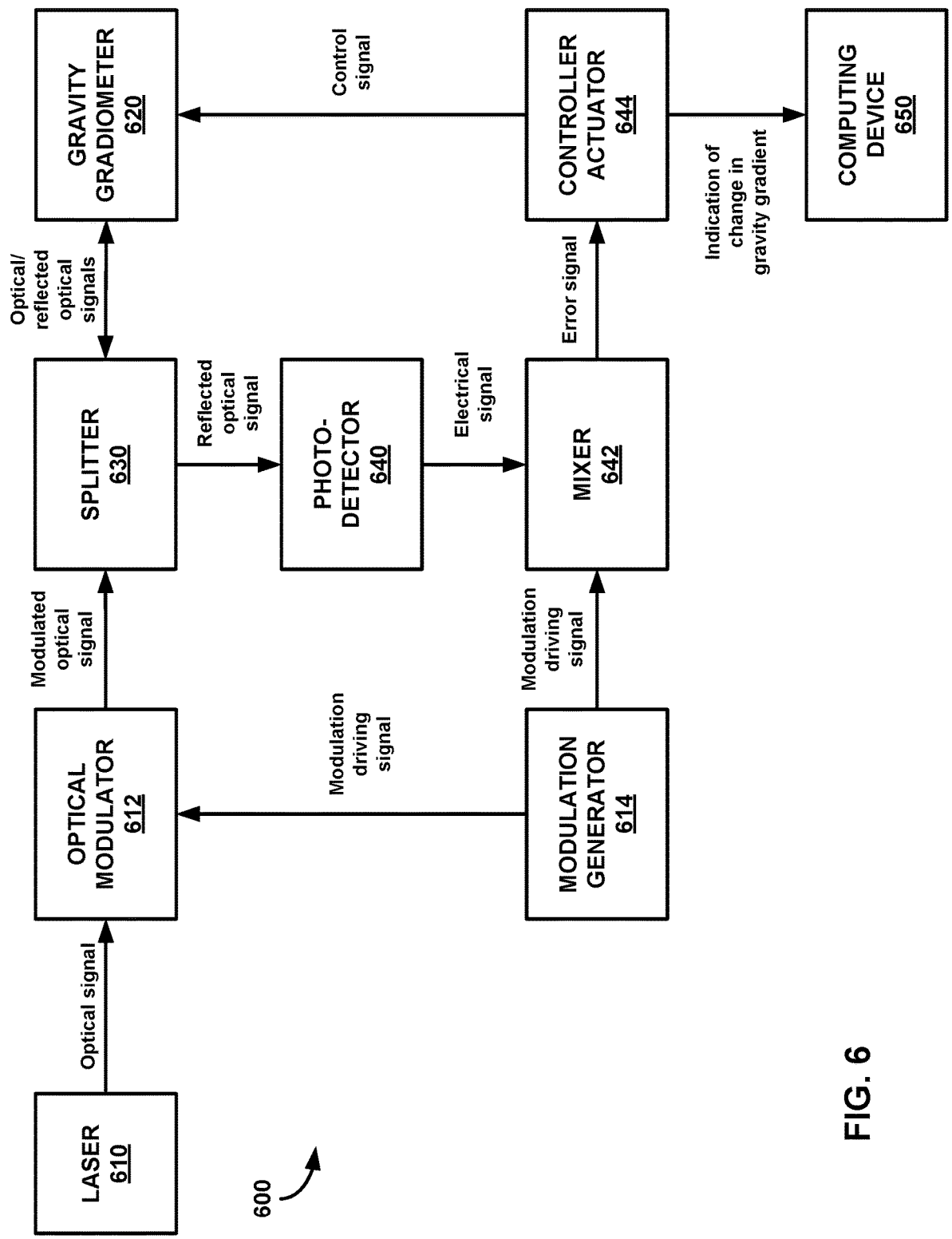
FIG. 6 is a conceptual and schematic block diagram illustrating an example sensing system for measuring a change in gravitational field caused by relative movement of an object or volume, in accordance with embodiments discussed herein.

FIG. 6 is a conceptual and schematic block diagram illustrating an example sensing system 600 for detecting a change in gravity gradient and measuring a gravity gradient and/or change in gravity gradient using a compact, highly sensitive gravity gradiometer, in accordance with embodiments discussed herein. Sensing system 600 includes a laser 610, an optical modulator 612, a modulation generator 614, a gravity gradiometer 620, a splitter 630, a photo-detector 640, a mixer 642, a controller actuator 644, and a computing device 650. Components of sensing system 600 of FIG. 6 may operate to at least include function of various components of sensing system 200 of FIG. 2. For example, a combination of laser 610, optical modulator 612, and modulation generator 614 may perform operations of optical source 210; gravity gradiometer 620 may perform operations of gravity gradiometer 220; and photo-detector 640, mixer 642, and controller actuator 644 may perform operations of feedback controller 230.

Sensing system 600 includes laser 610. Laser 610 is in optical communication with gravity gradiometer 620. For example, laser 610 may be aligned such that an optical signal emitted by laser 610 may contact gravity gradiometer 620 at a desired location. Laser 610 is configured to emit an optical signal at a resonant wavelength of an optical cavity of gravity gradiometer 620. As explained above, the resonant wavelength is a multiple of a preselected length of the optical cavity.

Modulation generator 614 is communicatively coupled to optical modulator 612 and mixer 642. Modulation generator 614 is configured to output a modulation driving signal to optical modulator 612. Optical modulator 612 is configured to receive the modulation driving signal and modulate the optical signal based on the modulation driving signal. The modulation driving signal represents a modulating phase or frequency shift of the optical signal. The modulating phase or frequency shift sweeps the resonant wavelength of the optical signal through the optical cavity of gravity gradiometer 620.

Splitter 630 is optically coupled to optical modulator 612 and photo-detector 640. Splitter 630 is configured to transmit the modulated optical signal from optical modulator 612 to gravity gradiometer 620 and reflect the reflected optical signal from gravity gradiometer 620 to photo-detector 640. Additionally or alternatively, sensing system 600 may include other light redirection components to control a direction of any of the optical signal, the modulated optical signal, and the reflected optical signal.

Gravity gradiometer 620 is optically coupled to optical modulator 612 and photo-detector 640 (via splitter 630). Gravity gradiometer 620 is configured to receive the modulated optical signal from optical modulator 612 and reflect at least a portion of the modulated optical signal to photo-detector 640 in response to a change in gravity gradient on gravity gradiometer 620. Gravity gradiometer 620 is electrically coupled to controller actuator 644. For example, gravity gradiometer 620 may be wired to a current source of controller actuator 644. Gravity gradiometer 620 is configured to receive a control signal from controller actuator 644, such as an electrical current. The drive and bearing system is configured to displace at least one of the first or second mirrors along the optical axis in response to receiving the current signal, such as a change in electrical current corresponding to the change in gravity gradient. Gravity gradiometer 620 may be operably similar to any of gravity gradiometer 220 of FIG. 2, gravity gradiometer 300 of FIG. 3A, gravity gradiometer 350 of FIG. 3B, gravity gradiometer 400 of FIG. 4, or gravity gradiometer 500 of FIG. 5.

Photo-detector 640 is in optical communication with gravity gradiometer 620 via splitter 630. Photo-detector 640 is configured to determine an intensity of the reflected optical signal from gravity gradiometer 620. For example, photo-detector 640 may be configured to convert received photons into a current representing the intensity. Photo-detector 640 is communicatively coupled to mixer 642. For example, photo-detector 640 may be wired to an input of mixer 642. Photo-detector 640 is configured to output an electric signal representing the strength of the reflected optical signal to mixer 642.

Mixer 642 is communicatively coupled to photo-detector 640 and modulation generator 614. Mixer 642 is configured to receive the electrical signal representing the strength of the reflected optical signal from photo-detector 640 and the modulation driving signal from modulation generator 614, and generate an error signal based on the electric signal and the modulation driving signal. For example, as explained above, the modulation driving signal causes a modulating phase or frequency shifts of the optical signal. As the resonant wavelength of the modulated optical signal is swept through the optical cavity of gravity gradiometer 620, the wavelength of the optical signal modulates around the resonant frequency, such that a sign of the optical signal corresponds to an increase or decrease in the length of the optical cavity of gravity gradiometer 620. The modulations are reflected by the optical cavity as off-resonant and detected by photo-detector 640 as an oscillating signal. To filter out the oscillating signal, the modulation driving signal waveform is mixed with the optical power signal waveform to generate an error signal. The error signal represents the strength of the reflected optical signal corrected for the modulating characteristics of the modulating optical signal. Mixer 642 is configured to output the error signal to controller actuator 644.

Controller actuator 644 is communicatively coupled to mixer 642 and gravity gradiometer 620. Controller actuator 644 is configured to receive the error signal from mixer 642 and generate one or more control signals from the error signal. The error signal represents the relative displacement between the first mirror and the second mirror, such that the optical cavity is out of resonance with the optical signal. To return the optical cavity to resonance, controller actuator 644 generates a control signal for the drive and bearing system of gravity gradiometer 620 that reverses the relative displacement between the first and second mirrors and returns the optical cavity to resonance.

Controller actuator 644 is electrically coupled to gravity gradiometer 620 and configured to output the control signal to gravity gradiometer 620. For example, controller actuator 644 may include a current source configured to output one or more current signals. In the example of FIG. 6, controller actuator 644 is communicatively coupled to a computing device 650 and configured to output an indication of the gravity gradient or change in gravity gradient to computing device 650. For example, the control signal to gravity gradiometer 620 represents the gravity gradient, as the control signal is related to the control force required to reverse the relative displacement of the first and second mirrors caused by the change in gravity gradient.

Figure 7:
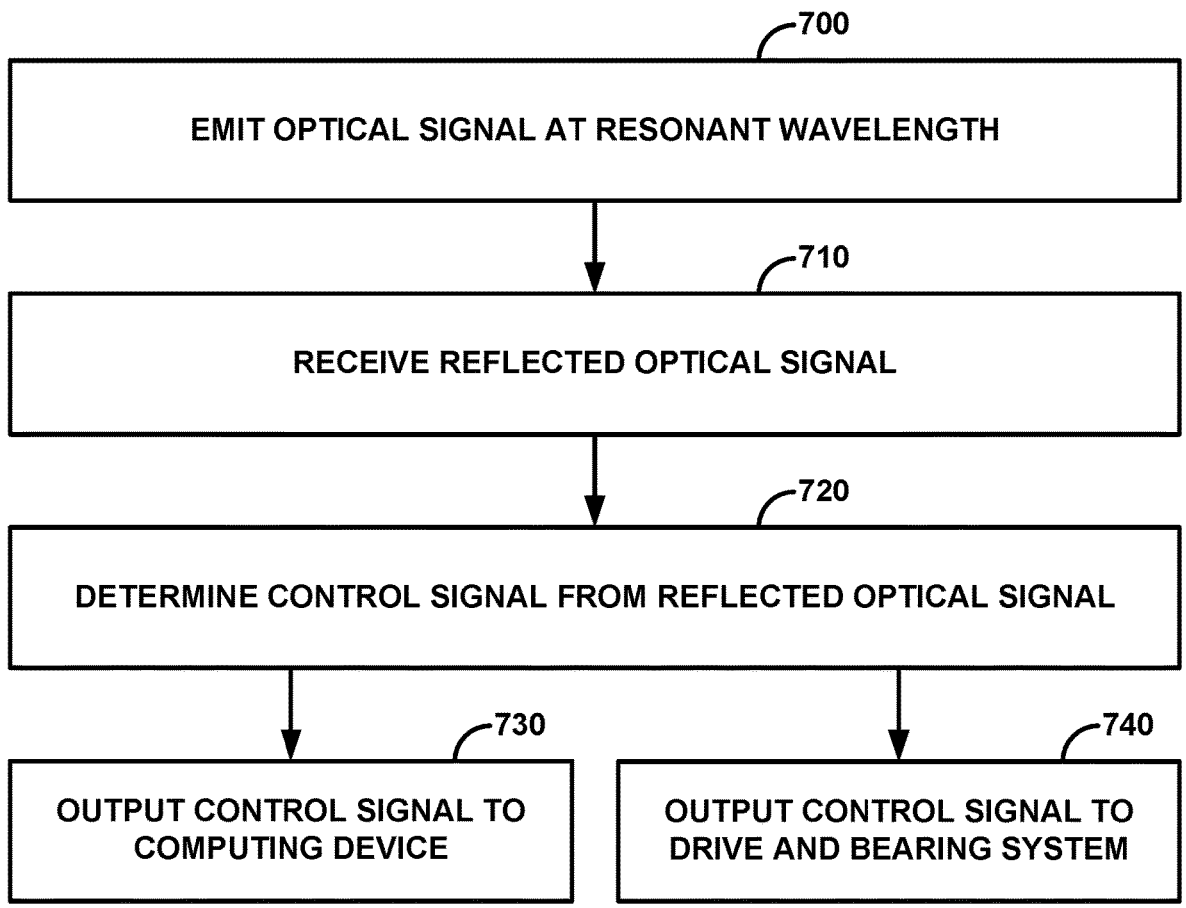
FIG. 7 is a flow diagram illustrating an example technique for detecting a change in gravitational field, in accordance with embodiments discussed herein.

FIG. 7 is a flow diagram illustrating an example technique for detecting a gravity gradient, in accordance with embodiments discussed herein. The technique of FIG. 7 will be described with reference to sensing system 200 of FIG. 2; however, other systems may be used to implement the technique of FIG. 7. In the technique of FIG. 7, sensing system 200 operates to detect, responsive to displacement of the first mirror with respect to the second mirror along the optical axis, a change in a gravitational force and output an indication of the detected change in the gravitational force, as will be described below.

Optical source 210 emits an optical signal at a wavelength that is resonant with an optical cavity of gravity gradiometer 220 (700). Relative movement of a volume, gravity gradiometer 220, or both, causes a relative displacement between the volume and gravity gradiometer 220, which in turn creates a change in gravity gradient. The change in gravity gradient caused by the relative movement of the volume causes differential displacement between the bearings of the drive and bearing system of gravity gradiometer 220 due to differences in proximity of each bearing of the drive and bearing system to the volume.

The relative displacement of one or both bearings of the drive and bearing system causes either or both of the first and second mirrors to displace, creating a change in length of the optical cavity. The optical signal having the previously-resonant wavelength is now be out of resonance with the optical cavity due to the change in length of the optical cavity. At least a portion of the optical signal is not admitted into the optical cavity of gravity gradiometer 220 and, instead, reflected by the optical cavity of gravity gradiometer 220. This reflected light is received by a photosensor or other detector coupled to feedback controller 230 (710). The intensity of the reflected optical signal represents the change in the length of the optical cavity. Feedback controller 230 generates, based on the sensed intensity of the reflected optical signal, a control signal, such as a current signal, for urging the mirrors to positions for restoring the optical length of the optical cavity (720). That is, feedback controller 230 configures the control signal, e.g., by setting the amplitude of the control signal, to a level sufficient to counteract the relative displacement of the one or both bearings of the drive and bearing system.

Feedback controller 230 outputs the control signal to gravity gradiometer 220 (740). The received control signal causes the drive and bearing system of gravity gradiometer 220 to displace the one or both bearings in a direction opposite the relative displacement of the one or both bearings to restore the length of the optical cavity to resonance with the optical signal. In this manner, feedback controller 230 operates in closed-loop fashion in which the control signal used to restore the optical cavity length is indicative of the gravity gradient operable on the movable mirrors of gravity gradiometer 220. In addition, feedback controller 230 outputs data indicative of the magnitude of the control signal to a computing device, such as computing device 120 of FIG. 1 (730), so as to provide the computing device with continuous indication of any change in sensed gravity gradient.

Figure 8A:
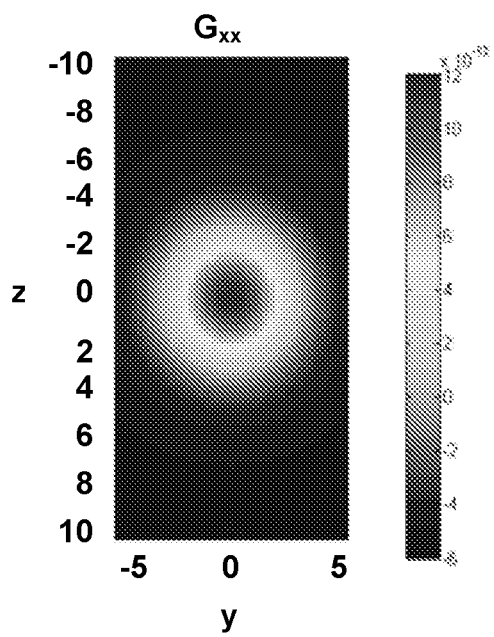
FIG. 8A is an example gradient heat map of a sphere for an x-axis component, in accordance with embodiments discussed herein.
Figure 8B:
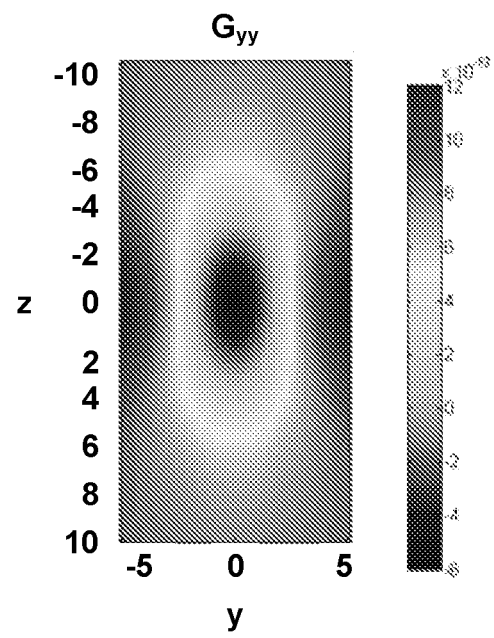
FIG. 8B is an example gradient heat map of a sphere for a y-axis component, in accordance with embodiments discussed herein.
Figure 8C:
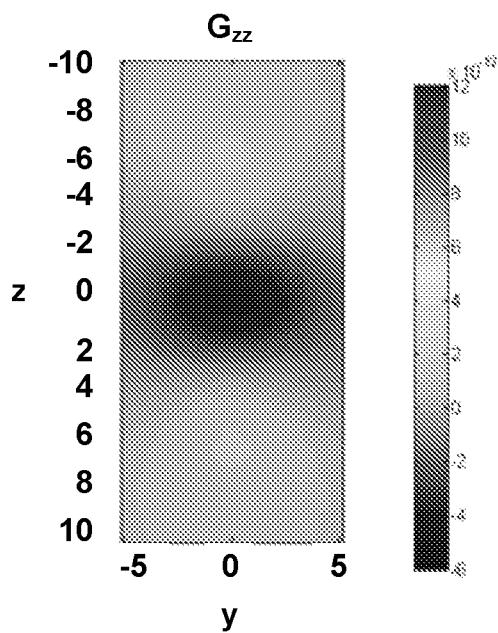
FIG. 8C is an example gradient heat map of a sphere for a z-axis component, in accordance with embodiments discussed herein.

FIGS. 8A-8C are example user interfaces displaying gradient heat maps of a sphere for three axis components, in accordance with embodiments discussed herein. FIG. 8A is an example user interface of a gradient heat map of the sphere for an x-axis component, FIG. 8B is an example user interface of a gradient heat map of the sphere for a y-axis component, and FIG. 8C is an example user interface of a gradient heat map of the sphere for a z-axis component, in accordance with embodiments discussed herein. As previously discussed in FIG. 1, gravity gradient detection system 110 may be used to generate a representation of an object based on a detected gravity gradient or change in gravity gradient over time and/or position. For example, the gradient heat maps in the example user interfaces of FIGS. 8A-8C may be generated from gravity gradient data associated with a sphere passing by three orthogonally-oriented gravity gradiometers as discussed herein, where each gravity gradiometer is oriented to detect a different axis component. The gravity gradient heat maps of FIGS. 8A-8C may be used to, for example, identify compositional properties of the sphere or construct a three-dimensional representation of the sphere.

Various examples have been described. These and other examples are within the scope of the following claims.

What is claimed is:
1. A gravity gradiometer, comprising:
a first mirror and a second mirror arranged to form an optical cavity having an optical axis; and
a drive and bearing system configured to displace at least one of the first and second mirrors along the optical axis in response to a change in gravity gradient,
wherein the optical cavity is configured to reflect an optical signal at off-resonant wavelengths in response to displacement of the at least one of the first and second mirrors along the optical axis, and
wherein the drive and bearing system is configured to differentially move the first and second mirrors along the optical axis, in response to electrical currents based on the reflected optical signal at the off-resonant wavelengths, to attempt to continuously maintain a specified length of the optical cavity.

2. The gravity gradiometer of claim 1, wherein the gravity gradiometer has a volume of less than 0.1 $m^3$.

3. The gravity gradiometer of claim 1, wherein the gravity gradiometer has a sensitivity to detect a gravity gradient of less than 1 eotvos.

4. The gravity gradiometer of claim 1, wherein the first and second mirrors are confocal mirrors.

5. The gravity gradiometer of claim 1, wherein the drive and bearing system further comprises:
a first diamagnetic mass coupled to the first mirror and a second diamagnetic mass coupled to the second mirror,
wherein the first and second diamagnetic masses are configured to differentially move the respective first and second diamagnetic masses along or parallel to the optical axis, in response to the change in gravity gradient, to create a change in a length of the optical cavity, and wherein the drive and bearing system is further configured to levitate the first and second diamagnetic masses.

6. The gravity gradiometer of claim 5, wherein the drive and bearing system further comprises a set of electromagnets arranged in proximity to the first and second diamagnetic masses and configured to differentially move the first and second diamagnetic masses, in response to the electrical currents based on the reflected optical signal at the off-resonant wavelengths, to attempt to continuously maintain the specified length of the optical cavity.

7. A sensing system, comprising:
a gravity gradiometer comprising a first mirror and a second mirror arranged to form an optical cavity having an optical axis; and
a controller configured to detect, responsive to displacement of at least one of the first mirror and the second mirror along the optical axis, a change in gravity gradient,
wherein the optical cavity is configured to reflect an optical signal at off-resonant wavelengths in response to displacement of the at least one of the first and second mirrors along the optical axis, and
wherein the gravity gradiometer is configured to differentially move the first and second mirrors along the optical axis, in response to electrical currents based on the reflected optical signal at the off-resonant wavelengths, to attempt to continuously maintain a specified length of the optical cavity.

8. The sensing system of claim 7, wherein the gravity gradiometer further comprises a drive and bearing system configured to cause the displacement of at least one of the first and second mirrors along the optical axis in response to the change in gravity gradient.

9. The sensing system of claim 8, wherein the controller is further configured to:
receive the reflected optical signal from the gravity gradiometer, wherein the reflected optical signal represents the displacement of at least one of the first mirror and the second mirror along the optical axis;
determine a control signal from the reflected optical signal; and
output, to the drive and bearing system, the control signal to reverse the displacement of at least one of the first mirror and second mirror along the optical axis.

10. The sensing system of claim 9, further comprising an optical source configured to emit an optical signal resonant with the optical cavity.

11. The sensing system of claim 7, wherein the controller is further configured to output an indication of the detected change in gravity gradient.

12. The sensing system of claim 11, wherein the indication of the detected change in gravity gradient is a control signal configured to reverse the displacement of at least one of the first mirror and second mirror along the optical axis.

13. The sensing system of claim 11, further comprising a computing device configured to:
receive the indication of the detected change in gravity gradient; and
generate a representation of an object based on the indication of the detected change in gravity gradient.

14. The sensing system of claim 13, wherein the indication of the detected change in gravity gradient is along one axis of relative movement.

15. The sensing system of claim 13, wherein the gravity gradiometer is a first gravity gradiometer and the change in gravity gradient is a first component of the change in gravity gradient, and further comprising a second gravity gradiometer comprising a third mirror and a fourth mirror arranged to form a second optical cavity having a second optical axis, and
wherein the controller is further configured to detect, responsive to displacement of at least one of the third mirror and the fourth mirror along the second optical axis, a second component of the change gravity gradient and output an indication of the second component of the change in gravity gradient, and
wherein the computing device is further configured to generate the representation of the object based on the indication of the first component and second component of the change in gravity gradient.

16. The sensing system of claim 7, wherein the sensing system is a weapon detection system.

17. A method, comprising:
reflecting, responsive to displacement of a first mirror with respect to a second mirror of an optical cavity along an optical axis, an optical signal at off-resonant wavelengths to detect a change in gravity gradient;
differentially moving the first and second mirrors along the optical axis, in response to electrical currents based on the reflected optical signal at the off-resonant wavelengths, to attempt to continuously maintain a specified length of the optical cavity; and
outputting an indication of the detected change in gravity gradient.

18. The method of claim 17, further comprising generating, based on the indication of the detected change in gravity gradient, a representation of a mass, wherein the indication of the detected change in gravity gradient includes a gravity gradient of the mass.

19. The method of claim 18, wherein the mass includes a cavity.

20. The method of claim 18, wherein the representation of the mass includes at least one of a gravity gradient spatial map, a gravity gradient heat map, a gravitational field representation, a visual representation of the mass, or a gravity gradient waveform versus time or position.

* * * * *